US010338958B1

(12) United States Patent
Kamboj et al.

(10) Patent No.: US 10,338,958 B1
(45) Date of Patent: Jul. 2, 2019

(54) STREAM ADAPTER FOR BATCH-ORIENTED PROCESSING FRAMEWORKS

(71) Applicant: .Amazon Technologies, Inc., Reno, NV (US)

(72) Inventors: Ankit Kamboj, Seattle, WA (US); Peter Sirota, Seattle, WA (US); George Steven McPherson, Seattle, WA (US); Vageesh Kumar, Seattle, WA (US); Sumit Kumar, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 405 days.

(21) Appl. No.: 14/165,521

(22) Filed: Jan. 27, 2014

(51) Int. Cl.
G06F 9/48 (2006.01)
G06F 16/25 (2019.01)
G06F 9/38 (2018.01)
G06F 8/41 (2018.01)

(52) U.S. Cl.
CPC ............ G06F 9/4881 (2013.01); G06F 8/453 (2013.01); G06F 9/3851 (2013.01); G06F 16/254 (2019.01)

(58) Field of Classification Search
CPC ...... G06F 9/466; G06F 9/4881; G06F 9/3851; G06F 8/453; G06F 17/30563
See application file for complete search history.

(56) References Cited

U.S. PATENT DOCUMENTS

| | | | | |
|---|---|---|---|---|
| 7,325,082 B1* | 1/2008 | Schibinger | ............. | G06F 9/526 370/369 |
| 2009/0217272 A1* | 8/2009 | Bortnikov | ............. | G06F 9/4843 718/101 |
| 2011/0179100 A1* | 7/2011 | Kawai | ............... | H04L 29/08135 709/201 |
| 2013/0145371 A1* | 6/2013 | Brunswig | ........... | G06F 11/1474 718/101 |
| 2013/0254771 A1* | 9/2013 | Musayev | ................ | G06F 9/466 718/101 |
| 2013/0318536 A1* | 11/2013 | Fletcher | ................ | G06F 9/5011 718/104 |
| 2014/0149987 A1* | 5/2014 | Barillari | ................ | G06F 9/4843 718/101 |

(Continued)

OTHER PUBLICATIONS

Amazon Web Services, "AWS Data Pipeline; Developer Guide; API Version", Oct. 29, 2012, pp. 1-337.

(Continued)

*Primary Examiner* — Jacob D Dascomb
(74) *Attorney, Agent, or Firm* — Robert C. Kowert; Meyertons, Hood, Kivlin, Kowert & Goetzel, P.C.

(57) ABSTRACT

An indication of an input data stream comprising data records, stored at a stream management service, that are to be batched for a computation at a batch-oriented data processing service is received. A set of data records of the input data stream are identified, based on respective sequence numbers associated with the records, for a particular iteration of the computation. Metadata associated with the particular iteration, comprising identification information associated with the set of records on which the computation is performed during the particular iteration, is saved in a repository.

20 Claims, 10 Drawing Sheets

(56) References Cited

U.S. PATENT DOCUMENTS

2014/0201737 A1* 7/2014 Mitkar .................... G06F 9/485
                                                        718/1
2015/0177820 A1* 6/2015 Kupermann .......... G06F 1/3293
                                                        713/323

OTHER PUBLICATIONS

Amazon Web Services, "Amazon Elastic MapReduce; Developer Guide, API Version", Mar. 31, 2009, pp. 1-539.
Amazon Web Services, "Amazon Kinesis; Developer Guide, API Version", Dec. 2, 2013, pp. 1-41.
U.S. Appl. No. 14/077,173, filed Nov. 11, 2013, Marvin Michael Theimer.
U.S. Appl. No. 14/077,171, filed Nov. 11, 2013, Marvin Michael Theimer.
U.S. Appl. No. 14/136,624, filed Dec. 20, 2013, Marvin Michael Theimer.
U.S. Appl. No. 14/136,645, filed Dec. 20, 2013, Marvin Michael Theimer.
U.S. Appl. No. 14/077,167, filed Nov. 11, 2013, Marvin Michael Theimer.
U.S. Appl. No. 14/077,162, filed Nov. 11, 2013, Marvin Michael Theimer.
U.S. Appl. No. 14/077,158, filed Nov. 11, 2013, Marvin Michael Theimer.
U.S. Appl. No. 14/065,102, filed Oct. 28, 2013, Taylor James White.
U.S. Appl. No. 14/165,110, filed Jan. 27, 2014, Joshua Elliot Caplan.
U.S. Appl. No. 61/921,377, filed Dec. 27, 2013, Mathew Mills.
U.S. Appl. No. 13/798,264, filed Mar. 13, 2013, Kathryn Marie Shih.
U.S. Appl. No. 14/187,455, filed Feb. 24, 2014, Joshua Elliot Caplan.

* cited by examiner

STREAM ADAPTER FOR BATCH-ORIENTED PROCESSING FRAMEWORKS

BACKGROUND

As the costs of data storage have declined over the years, and as the ability to interconnect various elements of the computing infrastructure has improved, more and more data pertaining to a wide variety of applications can potentially be collected and analyzed. For example, mobile phones can generate data indicating their locations, the applications being used by the phone users, and so on, at least some of which can be collected and analyzed in order to present customized coupons, advertisements and the like to the users. The analysis of data collected by surveillance cameras may be useful in preventing and/or solving crimes, and data collected from sensors embedded at various location within airplane engines, automobiles or complex machinery may be used for various purposes such as preventive maintenance, improving efficiency and lowering costs.

The increase in volumes of streaming data has been accompanied by (and in some cases made possible by) the increasing use of commodity hardware. The advent of virtualization technologies for commodity hardware has provided benefits with respect to managing large-scale computing resources for many types of applications, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In addition to computing platforms, some large organizations also provide various types of storage services built using virtualization technologies. Using such storage services, large amounts of data can be stored with desired durability levels.

Despite the availability of virtualized computing and/or storage resources at relatively low cost from various providers, however, the management and orchestration of the collection, storage and processing of large dynamically fluctuating streams of data remains a challenging proposition for a variety of reasons. Even in environments in which some of the problems of collecting and storing large volumes of streaming data have been overcome, utilizing the streaming data for many types of processing environments may not be straightforward. Some popular batch-oriented data processing environments may, for example, be designed to use static, fixed data sets input during each processing iteration, while streaming data typically flows continuously and with varying data arrival rates.

Figure 1:
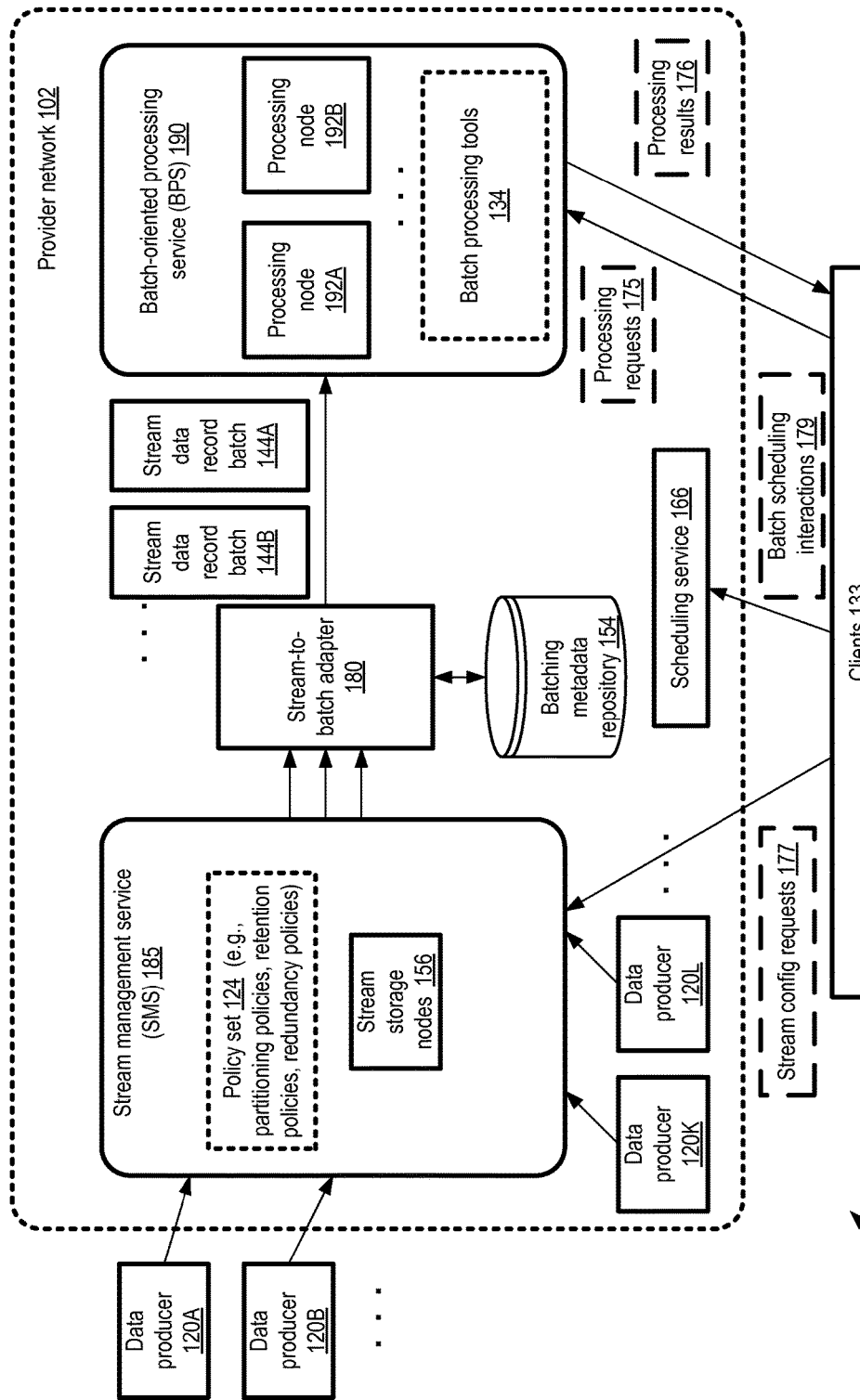
FIG. 1 illustrates an example system environment in which data records received at a stream management service may be grouped for processing at a batch-oriented processing service by an adapter acting as an intermediary, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for adapting data stream records for batch-oriented processing are described. The term "data stream", as used herein, refers to a sequence of data records that may be generated by one or more data producers and accessed by one or more data consumers, where each data record may be assumed to be an immutable sequence of bytes. A stream management service (SMS) may provide programmatic interfaces (e.g., application programming interfaces (APIs), web pages or web sites, graphical user interfaces, or command-line tools) to enable the creation, configuration and deletion of streams, as well as the submission, storage and retrieval of stream data records in some embodiments. Such APIs may be utilized by an adapter configured to extract data records from the SMS and group them for consumption by a batch-oriented processing service (BPS) as described below. Such an adapter may also be referred to herein as a "stream-to-batch" adapter. In effect, the adapter may be thought of as providing, for any given processing iteration, the illusion of a static input data set to the BPS, even though the underlying input data records may be arriving dynamically at varying rates and times at geographically distributed nodes of the SMS. Various types of batch-oriented processing frameworks may be implemented in different embodiments, such as the MapReduce programming model, or customer-specific or application-specific processing frameworks. At least for certain types of applications (such as log record analysis, web activity analysis, and the like), the batch processing may involve a series of iterations in which similar computation operations are performed on different input data sets in each iteration. In at least some embodiments, the adapter may be configured to generate a batch representation of the stream data records in an input format (e.g., text, JSON (JavaScript Object Notation), XML, serialized Java™ object format, or the like) that is expected by nodes of the batch-oriented processing framework.

The extraction and presentation of the stream data for the batch-oriented processing environment may be performed in a transparent manner in some embodiments, such that a client of the batch-oriented processing framework may have to expend minimal effort to utilize pre-existing batch processing tools (such as scripts or workflows of various kinds) on the stream data records. For example, in one implementation, such a client may simply specify the input stream and identify the batch processing service processing nodes to which the stream data should be directed, and the adapter may perform the necessary steps to collect and convey the stream data for processing. In at least some embodiments, the adapter may be self-tuning, in that the set of resources (e.g., compute servers) used for the transformation of the streaming data into batches suitable as input for processing may be dynamically re-sized based on various metrics of the adapter's batching performance (such as the extent to which the adapter is able to keep up with the rate of stream data ingestion). In at least one embodiment, the adapter may be implemented as a component of a network-accessible service, e.g., a service to which clients may submit requests via web services interfaces or other programmatic interfaces over a network. In one implementation, the adapter may be implemented as an add-on feature or component of a BPS— for example, the adapter may be included within a virtual machine image that may be used for BPS processing nodes as well.

In some embodiments, the SMS, the BPS and the adapter may all be implemented using resources of the same provider network. Networks set up by an entity such as a company or a public sector organization to provide one or more services (such as various types of cloud-based database, computing or storage services) accessible via the Internet and/or other networks to a distributed set of clients may be termed provider networks herein. Some of the services may be used to build higher-level services: for example, computing, storage or database services may be used as building blocks for an SMS, a BPS, or for a distributed stream-to-batch adapter. Operations performed at the SMS, the adapter and the BPS may be categorized into two broad types in some embodiments—"control-plane" or administrative operations, and "data-plane" operations. For example, with respect to the SMS, stream creation, deletion, or repartitioning may all be referred to as "control-plane" operations herein, while operations such as data record submissions, storage and retrievals that typically (e.g., under normal operating conditions) do not require interactions with control components may be referred to herein as "data-plane" operations. Respective sets of programmatic interfaces may be implemented by each of the services and/or by the adapter for control-plane and data-plane operations. Dynamically provisioned sets of compute, storage and networking resources may be used to implement the SMS, the adapter, and the BPS in some embodiments, based for example on various policies for scalable workload distribution. In at least some embodiments, the SMS, the BPS, and/or the adapter may be implemented as multi-tenant managed network-accessible services in a virtualization environment. That is, various physical resources (such as computer servers or hosts, storage devices, networking devices and the like) may at least in some cases be shared among streams of different customers, for converting stream data into batches, or for batch processing workflows of different customers in such embodiments, without necessarily making the customers aware of exactly how the resources are being shared, or even making a customer aware that a given resource is being shared at all. A given compute resource may be used to retrieve and batch stream data records of respective input streams for several different clients in some cases, and may provide the batched data to BPS nodes implementing respective applications on behalf of each of the clients. Control components of the services may dynamically add, remove, or reconfigure nodes or resources being used based on various policies, some of which may be client-selectable.

In at least some embodiments, to handle very large volumes of streaming data, the data records belonging to a particular data stream may be divided into partitions (e.g., on the basis of partitioning keys of the data records), with each partition being handled by a respective set of nodes of the SMS. The key(s) or key value(s) used for partitioning the data may be client-specified in some implementations, or selected by the SMS in other implementations. In some implementations, dynamic repartitioning of data streams may be supported—e.g., based on various triggering conditions, new partitions may be created, or some existing partitions may be merged or closed. No new data records may be accepted into a partition designated as closed in some embodiments—instead, newly-arriving records that would have been mapped to the closed partition may instead be incorporated within a different partition. In some embodiments in which dynamic repartitioning is supported, data records continue to arrive and be handled by the SMS, irrespective of when the repartitioning occurs; thus, neither the stream nor the SMS need be taken offline. The repartitioning may be initiated as a result of any of a number of factors—e.g., in response to a detection of an overload condition at an ingestion, storage, or retrieval node of the SMS, in response to a detection of a skew or imbalance between workload levels at different hosts of the SMS, or in response to a request from a data consumer or a data producer client. In some embodiments static repartitioning may be supported, in which at least the stream to be repartitioned may be taken offline temporarily and then reopened for data submission with a changed set of active partitions.

Records of various data streams may be retained at the SMS for a time window in some implementations, after which the records may be discarded in accordance with a retention policy. For example, in one implementation a retention time window of 24 hours may be used for some streams, such that at any point in time, records that were received at the SMS more than 24 hours earlier may no longer be required to be retained at the SMS's storage nodes. Other types of retention policies (such as policies governing the maximum amount of stream data to be retained, or the number of stream data records to be retained, rather than the amount of time for which a data record is retained) may be used in some embodiments. As described below in further detail, in at least some embodiments, each data record that is stored by the SMS may have a sequence number associated with it, indicative of an order, relative to other data records of the stream, in which the data record was received at the SMS. The sequence numbers may be used for retrieval of stream data records in the order in which the data records were generated, although the sequence numbers may not necessarily be accurate indicators of data record ingestion times in at least some embodiments.

According to at least some embodiments, a stream-to-batch adapter may receive an indication (e.g., in a configuration request submitted by a client of the BPS and/or the SMS, or in a command issued by a scheduling service on behalf of a client) of an input data stream whose records are to be extracted and batched for input to a specified BPS or a specified set of BPS nodes. The adapter may be configured to identify and retrieve, based at least in part on the respective sequence numbers associated with data records of the input data stream by the SMS, a set of data records of the input data stream on which certain processing computations are to be performed during a particular processing iteration at the BPS. Such a set of data records corresponding to one iteration of batch processing may be referred to herein as a "data batch", or simply a "batch", and the process of generating data batches may be referred to herein as "batching". Each batch generated by the adapter may correspond to a particular iteration of processing or computation at the BPS. It is noted that at least in some embodiments, the operations performed by the adapter to generate a given data batch, and the processing operations performed at the BPS on that data batch, may be scheduled independently—for example, if a batch is generated at time T1, this may not necessarily mean that the processing of that batch has to begin precisely at T1 or even precisely at T1+delta for any specific delta.

In one implementation, the adapter may save metadata that indicates the starting and ending sequence numbers of the data records retrieved for the batch for a given iteration of processing, so that the starting sequence number for iteration N+1 may be determinable from the ending sequence number of iteration N. (As described below, sequence numbers of stream data records need not be consecutive in at least some embodiments, so the numerical difference between the sequence number of the first data record retrieved for iteration N+1 and the sequence number of the last data record of iteration N may not necessarily be 1.) In embodiments in which the input data stream is partitioned, the metadata may include starting and ending sequence numbers for each active partition as described below. The determination of batch boundaries (i.e., the starting and ending data records of a given batch) may be based on various factors in different embodiments, including for example timeout settings, client-provided preferences, and the like. Some input data streams may have very low record ingestion rates at least over some time intervals, and a timeout may be used to stop collecting records for a given batch if no new records arrive over sufficiently long periods in some implementations.

In some embodiments, data records of a particular batch may be formatted in accordance with the input format specifications of the nodes of the BPS. For example, in one embodiment in which the batch processing service employs a variant of Hadoop (an open source MapReduce implementation), the data records may be placed in tables created using the Hive data warehouse infrastructure. The specific input format that is to be employed may be indicated by the client in some embodiments, or may be inferred by the adapter based on the specified BPS to which the batches are to be provided as input in other embodiments. The computations corresponding to the iteration may then be scheduled using selected processing nodes of the BPS. In some embodiments, simple tools such as shell scripts may be used to schedule the processing iterations, while in other embodiments, a scheduling service implemented at the provider network may be used. The scheduling service may allow clients to specify workflows comprising a set of tasks, with resource requirements, scheduling information, and dependency information for each of the tasks. Such workflows may be used to initiate the stream-to-batch conversions by the adapter, and/or to schedule the processing iterations at the BPS in some embodiments. In some embodiments, the scheduling service may be the primary means of interaction between the client and the adapter, or the client and the BPS.

The batch-related metadata stored by the adapter may be usable for various types of operations in different embodiments. As described above, sequence number boundary information for a previous batch may be used to identify the set of data records that are to be included in the next batch in at least some implementations. In addition, in some embodiments the metadata may be usable to perform different sets of computations, or to repeat earlier computation steps that did not finish successfully, on the same set of underlying data. Given a retrieval request specifying a starting sequence number S1 and an ending sequence number S2 for a given data stream or stream partition, the SMS may be responsible in some embodiments for returning the same set of data records no matter how many times the retrieval request is issued (as long as the SMS retains all the requested data records in accordance with applicable retention policies). Such an input data batch repeatability feature may be utilized to perform recovery operations in the event of BPS processing node failures, or to perform different sets of computations on the same batch of stream data records, in various embodiments. For example, at some point after a first set of computations is completed on a batch at the BPS, a client may issue a request to perform a different set of computations on the same batch (e.g., the client may include a batch identifier generated by the adapter as an input parameter in the request). In response to such a request, the metadata corresponding to the batch may be retrieved, and the set of data records of the batch may be retrieved from the SMS using the start and end sequence numbers indicated in the metadata. The manner in which sequence numbers are generated and assigned at the SMS may ensure in at least some embodiments that the same set of data records is returned for a specified (start, end) sequence number combination. The specified set of computations may then be performed on the batch. If some or all of the data records have been deleted by the SMS based on the stream's retention time window, the client may be informed that the records are no longer available. In some implementations, e.g., based on the client's preferences, the second set of computations may still be performed on an incomplete batch in a best-effort response to the client's request. In one embodiment, the adapter may be responsible for determining batch boundaries and storing batching metadata, but the actual retrieval of data records from the SMS may be performed by some other entity or process. For example, the adapter may provide the metadata to processing nodes of the BPS, which may then retrieve the data records using the sequence numbers.

In at least some embodiments, as noted above, data streams may be subdivided into partitions for scalability or other reasons. An SMS may support dynamic repartitioning of data streams in some embodiments—e.g., the set of partitions of a given stream (and hence the set of nodes at which the data records of the stream are received, stored, or retrieved for data consumers) may change over time. In such embodiments, the metadata stored by the adapter may include a list of currently active partitions of the input data stream (i.e., partitions to which data records are still being added, or from which data records are still being retrieved). Periodically, e.g., at the start of every batch generation, the adapter may submit a control-plane query to the SMS to obtain the latest list of active partitions of the input data stream. If the list has changed, e.g., if new partitions have been activated, or some partitions have been closed, the adapter may modify the its ongoing retrieval operations— e.g., additional retrieval processes may be launched to retrieve data records from the new partitions, or some retrieval processes may be repurposed.

Example System Environment

FIG. 1 illustrates an example system environment in which data records received at a stream management service (SMS 185) may be grouped for processing at a batch-oriented processing service (BPS 190) by an adapter 180 acting as an intermediary, according to at least some embodiments. As shown, system 100 comprises a provider network 102, which in turn includes a plurality of resources that are configured to implement several network-accessible services. The SMS 185 may comprise a plurality of service nodes that collectively are capable of receiving stream data records submitted by internal data producers (devices within the provider network, such as data producers 120K and 120L) and/or data producers outside the provider network (e.g., data producers 120A and 120B). A number of different types of data producers 120 may generate data for various streams to be stored and managed by the SMS 185 in different embodiments, such as, for example, mobile phone or tablet applications, sensor arrays, social media platforms, logging applications or system logging components running on various resources inside or outside the provider network, or monitoring agents of various kinds.

In the depicted embodiment, a set of policies 124, at least some of which may be selectable or configurable by clients 133 of the SMS, may be implemented for the data streams handled by the SMS. The policy set 124 may include, for example, partitioning policies used to determine how tasks related to data record ingestion, storage and retrieval are distributed among various nodes of the SMS, data retention policies that are used to limit the storage space required for data records, availability policies, data redundancy policies, and the like. A data retention policy may, for example, result in the deletion of data records that are more than X minutes/hours/days old—e.g., records that were generated more than X minutes/hours/days ago may be deleted from the storage nodes of the SMS by some set of "cleaner" processes run periodically. Other retention policies may be expressed in terms of data size rather than time—e.g., only X terabytes of storage may be allowed for a given stream's data records, with older data records being replaced by new data records after the storage space runs out. Some policies may be global (i.e., applicable to all the streams managed at the SMS), while others may be applicable to individual data streams or groups of data streams.

In some embodiments, a given data stream may be divided into subunits called stream partitions. The data records generated by data producers 120 may be distributed among partitions in such embodiments based on various factors, e.g., based on a partitioning key supplied by the data producers, or based on a portion of the data record contents. In other embodiments, at least some data streams may not be partitioned. In some implementations, as discussed in further detail below, each data record ingested by the SMS may have a sequence number assigned to it by the SMS, indicative of the order in which that data record was received at (or stored at) the SMS, relative to other data records of the same partition or the same stream. Sequence numbers may be used, for example, to retrieve data records in the order in which they were stored at the SMS. It is noted that although it may be possible for a data producer to include a timestamp indicative of the data record submission time within its data records, in general there may be no requirement that each data record have any specific timing-related information included in it. Thus, the sequence numbers, while generally indicative of the order of submission of data to a stream, may not be indicative of precise data record submission times in at least some embodiments. In addition, given the distributed nature of the provider network 102 and the SMS 185, it may not always be possible to infer from two sequence numbers (which may have been generated at different geographical locations at about the same time) that the data record with the smaller sequence number was submitted or accepted at a time earlier than the data record with the larger sequence number. In at least some embodiments, different partitions of a given stream may be stored at respective storage nodes 156 of the SMS, and retrieving the data of a particular stream may therefore require interactions with a plurality of SMS nodes. A number of different types of programmatic interfaces may be implemented by the SMS 185, including for example administrative or control-plane interfaces that may be utilized by clients 133 to for stream configuration requests 177.

One or more types of batch-oriented processing services 190 may be supported at a provider network 102 in various embodiments, each of which may implement respective programmatic interfaces enabling clients 133 to submit processing requests 175 that may indicate (among other parameters) the input data set for a requested set of computations. A BPS may expect a fixed data set, organized according to some specified acceptable format or formats, as input for a requested set of processing operations or computations. In at least some embodiments a given BPS may not be natively capable of collecting dynamically generated input data records such as the stream data managed by the SMS. The processing may be implemented in several stages in at least some BPSs—e.g., one set of processing nodes 192 (such as nodes 192A and 192B) may perform an initial set of computations, and the results of the initial set may be transmitted to a different set of processing nodes for further processing. In some embodiments, the MapReduce programming model may be implemented at one or more BPSs. In the MapReduce programming model, a large static input data set may divided into input subsets called "splits", e.g. based on a hash function applied to some input key or attribute, with each split being transmitted to a respective "Map" processing node 192 (e.g., nodes 192A and 192B shown in FIG. 1) for a first stage of processing. Results of the Map stage may then be distributed, e.g., after an intermediate stage involving sorting or grouping based on some other set of keys or attributes, among a second set of processing nodes called "Reduce" nodes. At the Reduce nodes, additional computations may be performed and the results may be combined or "reduced" to produce the final processing results 176 that may be supplied to the client 133 that requested the processing, or stored at a storage location indicated by the client. Map and reduce operations may both be performed at a given processing node 192 in some implementations, or separate processing nodes may be used for Map and Reduce operations. At least some BPSs 190 implemented within the provider network may have a set of tools 134 that may be invoked by clients 133 to specify the types of computations desired, the input data set locations, the output destination locations, and the like. Such tools may, for example, include configuration specifications, BPS-specific scripts, generic shell scripts, and the like. In a MapReduce environment, various scripts and/or programs implemented using the Hive infrastructure, the Pig programming language, and/or the Cascading application framework may be used for interacting with and managing MapReduce jobs. By building the BPS on top of core services of the provider network 102 such as a virtual computing service and various types of storage services, the set of resources actually deployed for a given batch processing computation may be modified over time in at least some embodiments, and the client on whose behalf the computations are performed may only be required to pay for the resources actually used.

In the depicted embodiment, stream-to-batch adapter 180 may be configured to extract data records stored at the SMS 185, and group the data records into batches 144 (e.g., 144A and 144B) for respective iterations of processing operations requested by clients 133. In some implementations, the adapter 185 may be packaged together with the software and/or hardware components used for the BPS processing nodes and tools. For example, in one provider network environment in which a virtualized computing service is implemented, clients may be allowed to select the virtual machine images that are to be used for their compute instances (logical units of computing power allocated/assigned to the clients). Some virtual machine images supported by the virtualized computing service may include the components required for the BPS processing and/or the adapter 185 in such embodiments. In other embodiments, a different machine image may be used for the adapter alone, or the adapter may be implemented using a different combination of hardware and/or software than is used for the BPS processing nodes. Clients 133 that wish to utilize the adapter for their applications may select the appropriate machine image and/or computing platform from among a number of options in various embodiments.

In some embodiments, the adapter 180 may receive an indication of a particular stream whose data records are to be retrieved and batched for a specified set of processing operations at the BPS 190. Such an indication may be provided, for example, using some of the batch processing tools 134, or in some other type of programmatic request submitted by a client 133. In response, the adapter 180 may determine the set of data records to be included in a batch of input data for at least a particular iteration of batch-oriented processing computations at the BPS 190. The adapter 180 may utilize sequence numbers associated with the stream's data records at the SMS in order to determine which set of data records are to be included in the batch.

Consider an example scenario in which a new batch of input data is to be collected every five minutes from a stream Sj by the adapter 180 for a set of computations C1 to be performed at nodes 192. Thus, each iteration of processing (apart from the first iteration, for which an arbitrary starting point may have to be selected, depending on how long ago the stream was created) may be intended to consume stream data records generated during (at least approximately) the previous five minutes. Assume that the request to start batching the data records was received at time Treq. For the very first iteration, in one implementation the adapter may attempt to identify and retrieve all the data records in the stream that were received before time Treq and are currently retained at the SMS (recall that older data records may be deleted over time in some SMSs based on a retention policy). The adapter may submit a request using an SMS API to identify the lowest sequence number among the retained data records, as well as the most recent sequence number assigned immediately prior to Treq. (Such requests may have to be issued on a per-partition level in some implementations rather than on the per-stream level.). Having obtained the requested sequence numbers, the adapter (or some other process or component associated with the BPS, to which the sequence number information may be provided by the adapter) may issue record retrieval API requests to obtain the data records in the range of the starting and ending sequence numbers. The retrieved data records may then form the "static" input data set 144 to be passed on to the appropriate processing nodes 192. In some embodiments, the data records may have to be formatted by the adapter in an input format acceptable to the BPS nodes, and/or stored at a memory or storage device accessible from the BPS nodes. In addition, depending on the nature of the programming model being used at the BPS, the records of the batch may have to be distributed among a plurality of processing nodes 192 by the adapter in at least one embodiment.

The adapter 180 may store batching metadata in repository 154 in the embodiment shown in FIG. 1, which may be usable to determine batch boundaries of subsequent batches, to respond to dynamic stream repartitioning, for re-performing processing on identical input data sets, and/or for other purposes. For example, for each batch 144 that it generates, adapter 180 may save the start and end sequence numbers of the data records included in the batch (this may also be done either on a per-partition level, or on a per-stream level, in different implementations). To determine which data records should be included in batch 144B, for example, the adapter may use the stored metadata to obtain the highest sequence number HSN-144A of the previous batch 144A, and issue retrieval requests using HSN-144A as the lower boundary for data records of batch 144B. The metadata stored for batch 144B may then be used to identify the data records to be included in batch 144C, and so on. In some embodiments, the metadata may include an indication of the list of currently-active partitions (i.e., partitions which have not been "closed" or terminated by the SMS due to repartitioning or failure) of the input data stream at the time that retrieval operations for a given batch were initiated (or completed). Such lists may be checked periodically (e.g., at the start of every batch generation) to discover whether some new partition has been created for which retrieval operations should be initiated, or if some partition is now closed and hence should no longer be the target of retrieval requests. In at least one implementation, a unique identifier may be included in the metadata for a given batch of data records, so that, for example, the same set of stream data records can be retrieved later for additional processing at the BPS or to re-do the same processing at the BPS as part of recovery operations subsequent to a failure of a BPS processing node.

Of course, in embodiments in which the SMS implements retention policies for the input data stream, it may be the case that by the time that the subsequent or re-do processing is requested, some of the data records are no longer available at the SMS. In the latter scenario, in some embodiments the request for processing the earlier batch may be rejected, while in other embodiments a best-effort approach may be used and any available records may be retrieved for the requested processing.

In at least some embodiments, the provider network may include a scheduling service 166 that can be used to launch the batching and processing operations—e.g., one or more scheduling service workflows or scripts may be used to invoke the adapter and/or to schedule BPS processing iterations every five minutes in the above example. The scheduling service 166 may provide programmatic interfaces enabling clients 133 to specify various details about the resources and/or applications to be scheduled, such as the number and type of compute instances to be used, dependencies among the various resources and applications, settings for exception or error handling, and the like. In some embodiments, iteration scheduling interactions 179 between clients 133 and the scheduling service 166 may represent the primary mechanism used by clients to manage stream-to-batch data transformations. In other embodiments, scheduling services may not be used.

Some data streams may have periods of low record ingestion rates—for example, no new data records may be added during several minutes or even hours, while at other times records may be added fairly steadily. In such scenarios, some clients may prefer that the adapter use timeouts, in addition to or instead of the sequence number criteria described above, to terminate data record retrieval operations for batches 144. Thus, in one example scenario, if the adapter is intended to retrieve data records generated over 15 minutes, and the client also wishes to stop accumulating data records for a given batch if there is no insertion activity for a five minute interval, a timeout of five minutes may be started every time a data record is retrieved by the adapter. If the timeout expires before a new data record is stored at the SMS for that stream or partition, the retrieval operations for that batch may be stopped instead of waiting until the 15 minute boundary is reached.

In some embodiments, the adapter itself may comprise a plurality of resources, such as compute instances of a virtual computing service implemented at the provider network. In at least one embodiment, the set of resources of the adapter may be modified over time, e.g., in response to analysis of metrics regarding the adapter's batching performance. For example, if five-minute batches are to be generated, and the stream's data record insertion rate is such that the adapter is unable to complete retrieving all the records that are inserted every five minutes, in one such embodiments extra resources may be deployed by the adapter in an effort to catch up with the stream data submissions. Conversely, if the adapter has numerous compute instances configured for retrieval operations (or for splitting batches for the BPS), and a large subset of the instances are idle over some time period, the number of instances allocated for the adapter may be reduced.

Data Streams Overview

Figure 2:
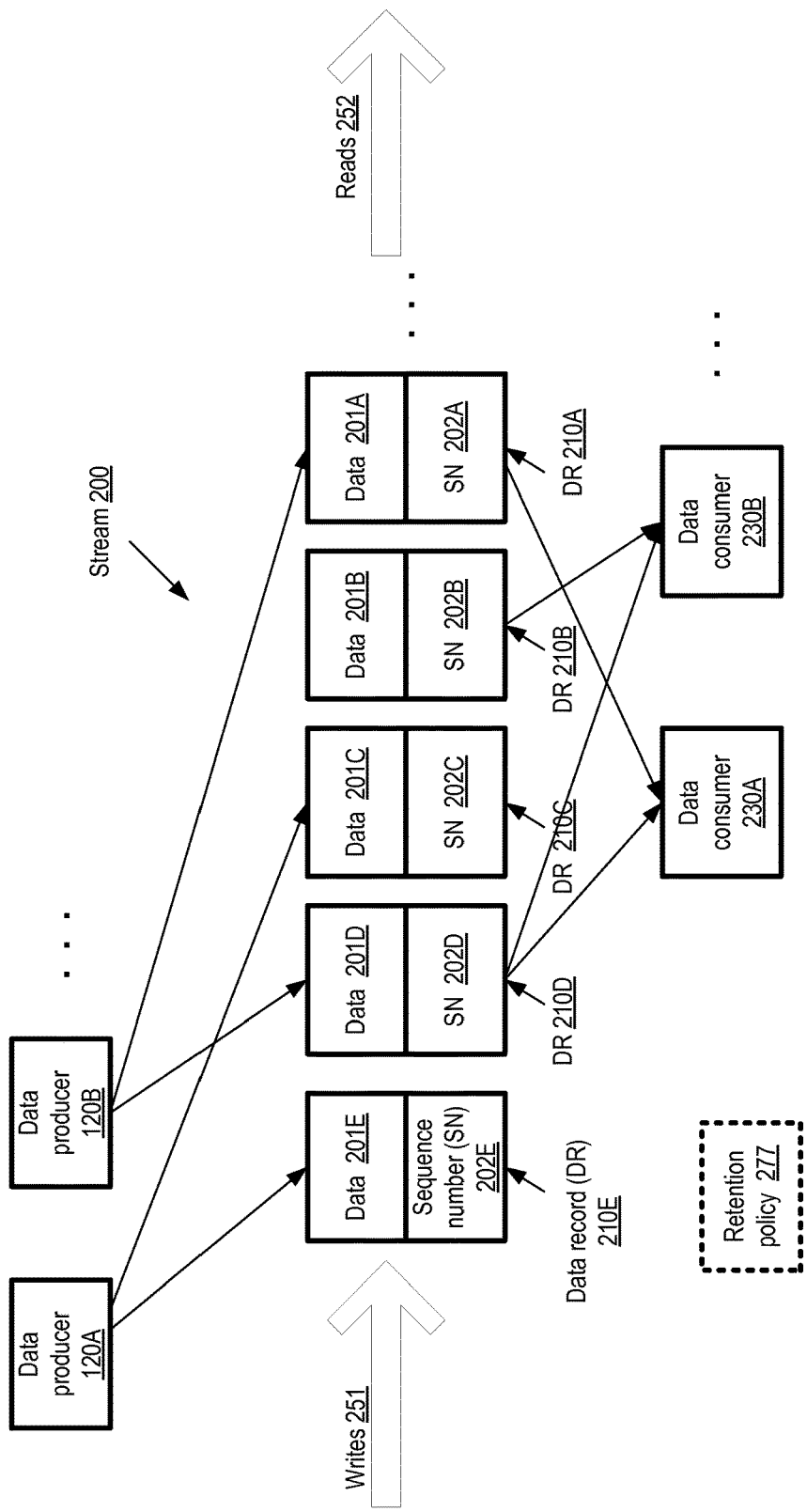
FIG. 2 provides a simplified overview of data stream concepts, according to at least some embodiments.

FIG. 2 provides a simplified overview of data stream concepts, according to at least some embodiments. As shown, a stream 200 may comprise a plurality of data records (DRs) 210, such as DRs 210A, 210B, 210C, 210D and 210E. One or more data producers 120 (which may also be referred to as data sources), such as data producers 120A and 120B, may perform write operations 251 to generate the contents of data records of stream 200. A number of different types of data producers may generate streams of data in different embodiments as noted above. For example, data records may be created and submitted by mobile phone or tablet applications, sensor arrays, social media platforms, logging applications or system logging components, monitoring agents of various kinds, and so on. One or more data consumers 230 (such as data consumers 230A and 230B) may perform read operations 252 to access the contents of the data records generated by the data producers 120. Data consumers 230 may comprise, for example, nodes of one or more stream-to-batch adapters 180. It is noted that in some embodiments, the processing nodes 192 of a BPS 190 may directly issue read requests to consume stream data records.

In at least some embodiments, a given data record 210 as stored in an SMS may comprise a data portion 201 (e.g., data portions 201A, 201B, 201C, 201D and 201E of DRs 210A, 210B, 210C, 210D and 210E respectively) and a sequence number SN 202 (e.g., SNs 202A, 202B, 202C, 202D and 202E of DRs 210A, 210B, 210C, 210D and 210E respectively). The sequence number 2102 may be indicative of the order in which the DRs are received at a stream management system (or at a particular node of a stream management system) in the depicted embodiment. The data portions 201 may comprise immutable un-interpreted byte sequences in some implementations: that is, once a write operation 252 is completed, the contents of the DR generated as a result of the write may not be changed by the SMS, and in general the SMS may not be aware of the semantics of the data. In some implementations, different data records of a given stream 200 may comprise different amounts of data, while in other implementations, all the data records of a given stream may be of the same size. In at least some implementations, nodes of the SMS (e.g., ingestion nodes and/or storage nodes) may be responsible for generating the SNs 202. As described below in further detail, the sequence numbers of the data records need not always be consecutive. In one implementation, clients or data producers 120 may provide, as part of a write request, an indication of a minimum sequence number to be used for the corresponding data record. In some embodiments, data producers 120 may submit write requests that contain pointers to (or addresses of) the data portions of the data records, e.g., by providing a storage device address (such as a device name and an offset within the device) or a network address (such as a URL) from which the data portion may be obtained.

The stream management service may be responsible for receiving the data from the data producers 120, storing the data, and enabling data consumers 230 to access the data in one or more access patterns in various embodiments. In at least some embodiments, as mentioned earlier, the stream 200 may be partitioned or "sharded" to distribute the workload of receiving, storing, and retrieving the data records. In such embodiments, a partition or shard may be selected for an incoming data record 210 based on one or more attributes of the data record, and the specific nodes that are to ingest, store or respond to requests to retrieve the data record may be identified based on the partition. In some implementations, the data producers 120 may provide explicit partitioning keys with each write operation which may serve as the partitioning attributes, and such keys may be mapped to partition identifiers. In other implementations, the SMS may infer the partition ID based on such factors as the identity of the data producer 120, the IP addresses of the data producers, or even based on contents of the data submitted. In some implementations in which data streams are partitioned, sequence numbers may be assigned on a per-partition basis—for example, although the sequence numbers may indicate the order in which data records of a particular partition are received, the sequence numbers of data records DR1 and DR2 in two different partitions may not necessarily indicate the relative order in which DR1 and DR2 were received. In other implementations, the sequence numbers may be assigned on a stream-wide rather than a per-partition basis, so that if sequence number SN1 assigned to a data record DR1 is lower than sequence number SN2 assigned to data record DR2, this would imply that DR1 was received earlier than DR2 by the SMS, regardless of the partitions to which DR1 and DR2 belong.

The retrieval or read interfaces supported by an SMS may allow data consumers 230 to access data records sequentially and/or in random order in various embodiments. In one embodiment, an iterator-based set of read application programming interfaces (APIs) may be supported. A data consumer 230 such as an adapter 180 may submit a request to obtain an iterator for a data stream, with the initial position of the iterator indicated by a specified sequence number and/or a partition identifier. After the initiator is instantiated, the data consumer may submit requests to read data records in sequential order starting from that initial position within the stream or the partition. If a data consumer wishes to read data records in some random order, a new iterator may have to be instantiated for each read in such embodiments. In at least some implementations, the data records of a given partition or stream may be written to disk-based storage of the SMS in sequence number order, typically using sequential write operations that avoid disk seeks. Sequential read operations may also avoid the overhead of disk seeks. Accordingly, in some embodiments, data consumers may be encouraged to perform more sequential reads than random reads using pricing incentives: e.g., random-access read operations such as iterator instantiations may have higher associated billing rates than sequential-access read operations. In at least some embodiments, data records 210 may eventually be discarded from a data stream 200 based on a retention policy 277, e.g., after a specified amount of time has elapsed since the data record was stored or accepted for storage in the stream. In this way, only the most recent set of data records generated, which may typically be of the greatest interest for some types of applications, may be retained in the SMS's storage devices, thus reducing the overall space requirements for managing large streams.

SMS Components

Figure 3:
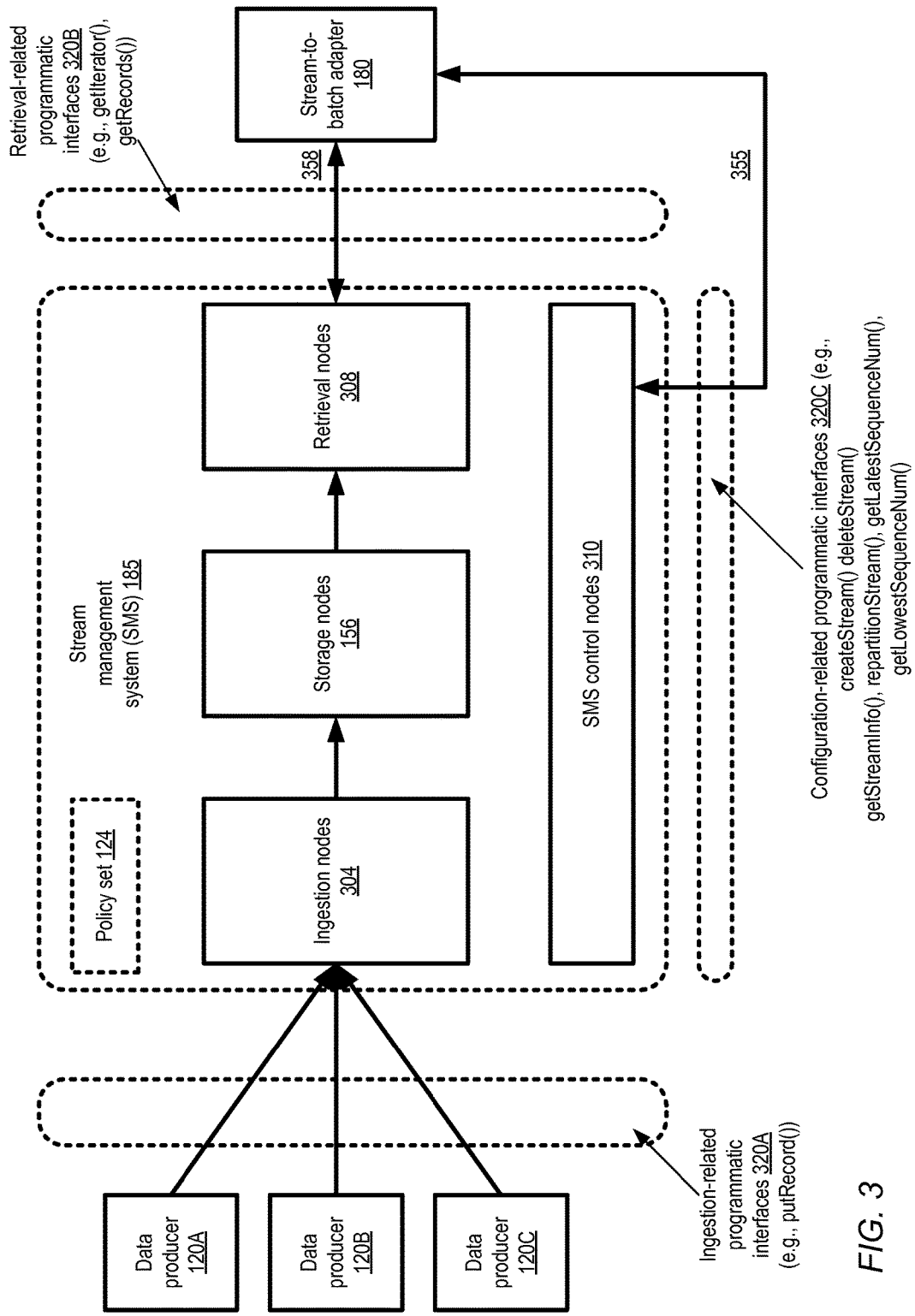
FIG. 3 provides an overview of example components of a stream management service and their interactions with an adapter configured to group stream data records for a batch-oriented processing service, according to at least some embodiments.

FIG. 3 provides an overview of example components of a stream management service (SMS) 185 service and their interactions with an adapter configured to group stream data records for a batch-oriented processing service, according to at least some embodiments. As shown, the SMS 185 may comprise ingestion nodes 304, storage nodes 306, retrieval nodes 308, and control nodes 310. Each collection of nodes may also be referred to as a subsystem for the corresponding functionality herein—e.g., the SMS may be described as comprising an ingestion subsystem, a storage subsystem, a retrieval subsystem and a control subsystem. Each of the nodes of the SMS may be implemented, for example, using respective executable threads or processes instantiated at various resources of a provider network. A client 133 may utilize configuration-related programmatic interfaces 320C to request stream creation (e.g., using a createStream API), deletion (e.g., using a deleteStream API), or repartitioning (e.g., using a repartitionStream API). Information about the stream, such as a list of identifiers of the active partitions of the stream to which data submissions are currently being accepted, may be obtained by the adapter 180 and/or other clients using various query APIs such as getStreamInfo in the depicted embodiment. In addition, in at least some embodiments various types of queries regarding sequence numbers may also be supported, such as getLatestSequenceNum (to obtain the most recent sequence number generated for a given stream or stream partition) or getLowestSequenceNum (to get the lowest sequence number for the set of data records of a particular stream or stream partition that are currently retained at the SMS in accordance with the applicable retention policy). As indicated by the arrow labeled 355, the stream-to-batch adapter 180 may query the SMS using various configuration-related programmatic interfaces, e.g., to determine the set of active partitions of a stream or to determine the range of sequence numbers of data records of a data stream. Other control-plane interfaces may be implemented by the SMS and utilized by the adapter in different embodiments.

Ingestion nodes 304 may be configured (e.g., by control nodes 310) to obtain data records of a data stream from data producers 120 (such as 120A, 120B, and 120C) based on a particular partitioning policy (of policy set 124) that is in use for the stream. Ingestion-related programmatic interfaces 320A (such as a putRecord API) may be used by the data producers 120 to submit the data records in the depicted embodiment. In some embodiments, the ingestion nodes may pull data records from the data producers instead of, or in addition to, responding to data record submission requests. In some embodiments, streams may not be partitioned, in which case other policies (such as load balancing policies) may be used to identify the specific sets of nodes to be used for a given data stream. Each ingestion node may pass received data records on to a corresponding storage node 156 in some embodiments. The storage nodes may save the data records (at least temporarily, in accordance with a retention policy of policy set 124) on any of various types of storage devices in accordance with a persistence policy selected for the stream.

Retrieval nodes 308 may respond to read requests from data consumers, such as stream-to-batch adapter 180 in the depicted embodiment, as indicated by the arrow labeled 358. For example, a getIterator API may be supported to position an iterator within a stream (or within a partition) based on a sequence number included as a parameter, and the getRecords API may then be used to retrieve some number of data records starting at a specified iterator position within a stream or partition. Other retrieval APIs, such as APIs for random reads within a stream based on sequence number without instantiating an iterator, or queries regarding counts of data records that meet a certain criteria, may also be supported in various embodiments and used by the adapter 180 as needed.

Nodes of the SMS (including ingestion, storage, retrieval, and control nodes) may each comprise respective threads or processes executing at various compute instances launched on a plurality of instance hosts of a virtual computing service of a provider network 102 in some embodiments. A given instance host may comprise several compute instances, and the collection of compute instances at a particular instance host may be used to implement nodes for various different streams of one or more clients. Storage instances of various storage services implemented at the provider network may be used for storing the data records of various streams in some embodiments, and/or as destinations of the results of BPS processing iterations. Over time, control nodes 310 may modify the populations of the other SMS subsystems dynamically in response to various triggering conditions, e.g., by adding or removing nodes, changing the mappings of nodes to processes or compute instances or instance hosts, or dynamically re-partitioning a given stream while still continuing to receive, store and process data records. Architectures other than that illustrated in FIG. 3 may be used for SMSs in some embodiments—e.g., storage and retrieval functionality may be combined into a single set of nodes, or a given node may be configured to perform ingestion, storage and retrieval.

BPS Components

Figure 4:
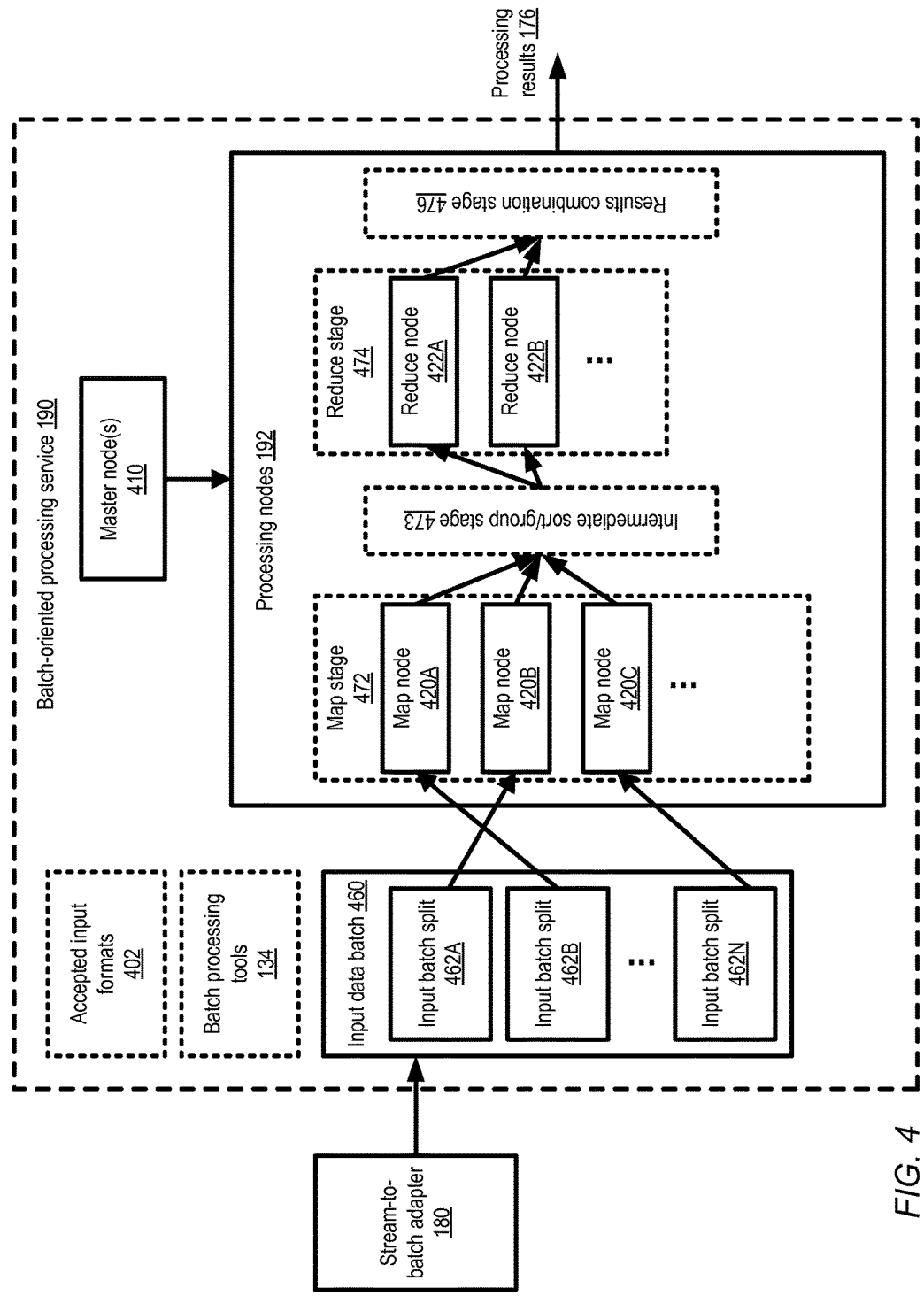
FIG. 4 provides an overview of example components of a batch-oriented processing service, according to at least some embodiments.

FIG. 4 provides an overview of example components of a batch-oriented processing service (BPS) 190, according to at least some embodiments. The BPS 190 may include one or more master nodes 410 and a plurality of processing nodes 192 in the depicted embodiment. The master node(s) 410 may represent one or more coordinator processes that coordinate computations performed by the processing nodes 192. The processing nodes may be categorized into several stages, such as Map stage 472 and Reduce stage 474 in the depicted embodiment, with each stage corresponding to a corresponding phase of processing. Processing nodes may also be referred to as "worker hosts," "workers," or "hosts." The BPS 190 may use one or more networks or interconnections to couple the various nodes. Elements of the BPS may be located in any suitable location relative to one another, from being virtual compute instances hosted on the same computing hardware to being different physical compute instances hosted in the same data center to being geographically remote. In the depicted embodiment, the BPS 190 may implement a MapReduce architecture or programming model in which the processing nodes of a given stage perform similar tasks concurrently under the direction of the master node(s). In other embodiments, other types of distributed computation architectures may be employed instead of or in addition to MapReduce.

In the depicted embodiment, an input data batch 460 for a given iteration of processing at the BPS may be generated by adapter 180, e.g., using retrieval APIs of an SMS 185 as described earlier. For example, if a log analysis computation is to be performed using BPS 190, the set of data records of a log data stream received at the SMS from a plurality of logging processes (data producers) and collected by the adapter 180 every N minutes may form a data batch 460. Data from other sources, not shown in FIG. 4, may also be used in combination with the stream data records in some embodiments. An input data batch 460 may be divided into sub-units called "splits" 462, such as split 462A, 462B or 462N. The splits 462 may also be referred to as input data partitions (which are not to be confused with data stream partitions). One or more of the splits of the input data batch 460 may be assigned to each of the nodes 420 of the Map stage 472 in the depicted embodiment. The input data batch may be split on any suitable basis. For example, split boundaries may be based on the boundaries between individual records, individual lines of data, etc. An individual split may include elements of input data, such as related items or families of items, that are intended to be processed together by a single processing node. The methodology used for assignment of splits to individual Map nodes 420 may vary in different embodiments.

In one embodiment, the adapter 180 may be responsible for logically subdividing the input batch data for the various Map nodes. For example, in embodiments in which streams are partitioned, some of the same types of keys and/or functions that are used to partition the stream at the SMS may be used to generate the splits 462 in one implementation. In another implementation, a different input data distribution scheme may be employed. In at least some embodiments, if two data records DR1 and DR2 were part of the same stream partition Pk of the input data stream in the SMS, they need not necessarily be included in the same input batch split 462. Similarly, if two data records are incorporated within the same data split 462, this may not imply anything about the partitions in which they were stored at the SMS. In some embodiments, the master node(s) 410 may logically subdivide the input data batch for the individual Map nodes. The manner in which the Map nodes 420 acquire or read the contents of the splits may differ in different implementations. In some embodiments, the Map nodes may be provided pointers to regions in memory or at a storage device at which their respective input data splits are available. Depending on the specifics of the implementation of the Map nodes, different input formats 402 may be accepted at a BPS in different embodiments (e.g., JSON objects, text objects, or de-serialized Java objects may be acceptable in various BPSs). In one embodiment, the adapter may populate one or more data structures (e.g., in memory or persistent storage accessible to the Map nodes) at which the retrieved stream data records can be accessed in an acceptable input format 402.

Any desired types of computation operations may be performed during the Map stage in different embodiments. In one embodiment, the master node(s) 410 may send program code to the Map nodes 420, or may instruct the Map nodes to load the program code from one or more storage locations. At least a portion of the processing tasks performed by the Map nodes 420 (and the processing nodes 192 in general) may be performed concurrently, i.e., in parallel relative to each other. In some embodiments, each of the Map nodes 420 may perform similar tasks and/or implement similar algorithms to process its portion of the input data. The output of the computations performed by the Map nodes 420 may be further processed (e.g., sorted or grouped) at an intermediate stage 473 in some embodiments, and then passed on to nodes 422 of a Reduce stage for the next set of computations. The output from different Reduce nodes such as 422A and 422B may be combined in some embodiments at a combination stage 476 before the overall results 176 are provided to the client on whose behalf the BPS was configured, or stored at a location of the client's choice. In some embodiments, Map and Reduce computations for a given input data split may be performed at the same virtual and/or physical computing device.

In the context of embodiments in which provider network resources are used for the adapter 180, the SMS 185 and/or the BPS 195, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. Clients of one service may themselves be implemented using resources of another service—e.g., as described earlier, the adapter 180 (a client of the SMS) may comprise one or more compute instances (a resource provided by a virtualized computing service). A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services (the SMS or the BPS) and/or the adapter in various embodiments. Clients may interact with resources and services at the provider network from devices located at client-owned or client-managed premises or data centers external to the provider network, and/or from devices within the provider network. It is noted that although provider networks serve as one example context in which many of the stream management, stream-to-batch conversions, and batch processing techniques described herein may be implemented, those techniques may also be applied to other types of distributed systems than provider networks, e.g., to large-scale distributed environments operated by a single business entity exclusively for its own applications.

Example Batch Processing Scripts and Schedules

In some embodiments, a number of batch processing tools 134 may be available to, and/or developed on behalf of, various clients of the BPS. Such tools may include scripts or programs written in various programming languages or shell environments. For example, some MapReduce execution environments may provide support for the Hive data warehousing infrastructure, and a Hive script similar to the following may be prepared for a particular log record analysis application in which log messages at the "ERROR" logging level are to be extracted from a larger stream of log records during the batch processing iterations. (Line numbers have been added in the following script to help explain the corresponding script code.)

------Example Hive script "LogAnalysisScript" for logging application:
1. ADD jar <path to SerDe jar file>;
2. SET hive.exec.dynamic.partition=true;
3. SET hive.exec.dynamic.partition.mode=nonstrict;
4. CREATE TABLE errorsTable1 (customerId STRING, errorMessage STRING)
5. PARTITIONED BY (date STRING, hour INT)
6. LOCATION <storageLocation1>;
7. CREATE TABLE inputTable1 (customerId STRING, errorMessage STRING, timestamp BIGINT, messageType STRING)
8. ROW FORMAT
9. SERDE <SerDe Class name>
10. WITH SERDEPROPERTIES (
11. 'paths'='customerId, errorMessage, timestamp, messageType'
12.)
13. STORED BY<StreamAdapter Class name>
14. TBLPROPERTIES (<streamName>="logStream1")
15. INSERT OVERWRITE TABLE errorsTable1 SELECT customerId, errorMessage, to_date(timestamp), hour(timestamp) FROM InputTable1 WHERE messageType='ERROR';
------End example Hive script for logging analysis In the above example script, various configuration settings are specified in lines 1-3, such as a path to the "SerDe" (serializer/deserializer) jar (Java™ archive) file that contains the executable code be used for reading input data into the Hive environment, as well as Hive partitioning settings. In lines 4-6, a Hive table ("errorsTable1") in which extracted log messages at the ERROR log level are to be saved is created. The table entries are to be partitioned within Hive on the basis of the date and the hour in which the corresponding log records were generated. Lines 7-14 comprise the Hive code that describes the table used for input data—e.g., the name of the stream ("logStream1") from which the log records are to be extracted, the row format in which the log records are to be stored within Hive, and the names of the columns of the input data table. The "STORED BY" entry may be used to indicate the stream-to-batch adapter (identified by the StreamAdapter Class name) being used. Line 15 indicates that only log records of type "ERROR" are to be extracted into the errorsTable1 during batch processing. In this example, the log data producers include timestamps within the log data records indicating when the records were generated, and the timestamps are used to sort the log data records during processing. As mentioned earlier, for at least some streams, timestamp information may not be included within stream data records, and sequence numbers may be used for determining the approximate order in which data records were ingested into a stream.

Batching and processing iterations in which scripts such as the Hive script shown above are invoked may be managed using scheduling service 166 in some embodiments. An example schedule definition file that may be used at a scheduling service in one such embodiment is shown below:
------Example schedule definition "LogAnalysisSchedule" for logging application
{
"objects": [
  {
    "id": "LogAnalysisResource",
    "coreInstanceCount": "2",
    "schedule": {"ref": "ResourcePeriod"},
    "type": "BPSCluster",
    "actionOnTaskFailure": "terminate",
    "masterInstanceType": "medium",
    "enableDebugging": "true",
    "coreInstanceType": "large"
  },
  {
    "id": "SMSActivity",
    "type": "HiveActivity",
    "runsOn": {"ref": "LogAnalysisResource"},
    "schedule": {"ref": "ActivityPeriod"},
    "scriptUri": "<LogAnalysisScript URI>"
  },
  {
    "id": "ActivityPeriod",
    "type": "Schedule",
    "startDateTime": "2013-03-15-00:00:00",
    "endDateTime": "2013-03-20-00:00:00",
    "period": "1 hour"
  },
  {
    "id": "ResourcePeriod",
    "type": "Schedule",
    "startDateTime": "2013-03-15-00:00:00",
    "endDateTime": "2013-03-20-00:00:00",
    "period": "1 hour"
  }
]
}
------End example schedule definition "LogAnalysisSchedule"

In the example schedule definition, the resources to be used for a batch-oriented processing cluster (BPSCluster) are indicated in the first entry with the identifier "LogAnalysisResource": for example, a "medium" sized compute instance is to be used as a master node 410, while two "large" compute instances are to be used as processing or "core" nodes. The resources are to be activated every hour during the time period indicated in the "ResourcePeriod"

entry. The LogAnalysisScript Hive script discussed earlier is to be invoked as part of an iterated activity called "SMS-Activity", scheduled once every hour during a time period indicated in the "ActivityPeriod" entry. The path to the Hive script is indicated in the "scriptUri" entry.

In some embodiments, instead of using a scheduling service, a client of a BPS may simply use standard shell scripts to invoke Hive scripts or other tools at desired points in time. For example, a bash script similar to the following may be used in some Linux or Unix™-based execution environments:

```
------Example shell script for scheduling Hive script
#!/bin/bash
iter=1
while:
  do
    echo "Starting iteration: "$iter
    hive -f<path to Hive script>
    iter=$[$iter+1]
    sleep <time interval between batches>
  done
------End example shell script for scheduling Hive script
```

Sequence Numbers

Figure 5A:
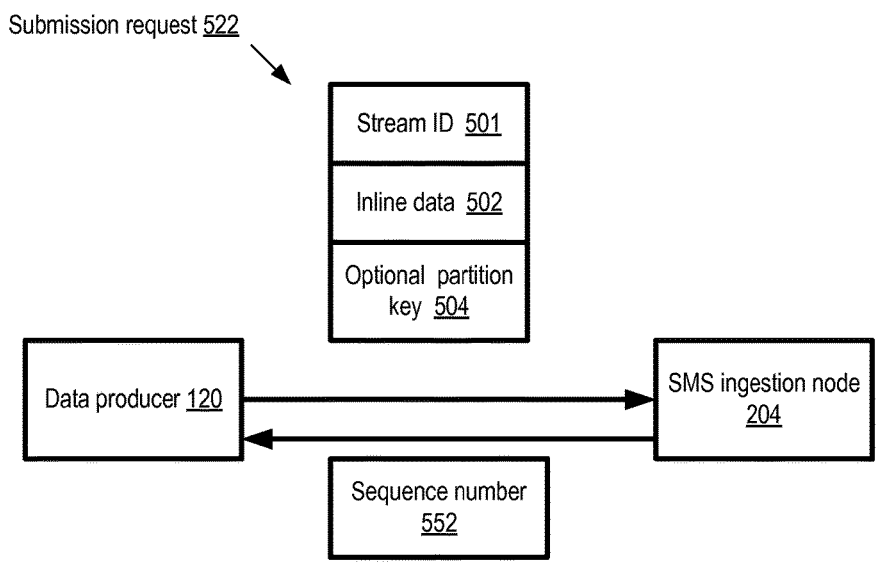
FIG. 5*a* illustrates example interactions between a stream data producer and an ingestion node of an SMS, according to at least some embodiments.

As indicated earlier, in at least some embodiments the SMS may assign sequence numbers to stream data records, e.g., as part of the data record ingestion process. The sequence numbers may later be used for ordered retrieval of the data records by a stream-to-batch adapter 180 or by other clients or data consumers. FIG. 5a illustrates example interactions between a stream data producer and an ingestion node of an SMS, according to at least some embodiments. The stream data producer may transmit a submission request 522 to an ingestion node 304. The submission request may include, for example, the stream identifier 501 of the targeted stream as well as an inline data field 502 comprising the data or body of the record to be added to the stream. The stream identifier may for example have been returned earlier in response to a createStream API invocation by a client of the SMS. In some embodiments, additional optional parameters may be included in the submission request, such as a partition key 504. In embodiments in which partitioned streams are implemented, a partition key included in the submission request may be used to determine the partition to which the submitted data should be added. In some embodiments, the SMS may select the partition on its own, and a key may not be required as part of the submission request. The ingestion subsystem may respond with a sequence number 552 that has been chosen for the submitted record. In at least some embodiments, an ingestion node may obtain a portion of the sequence number from the storage subsystem—e.g., the sequence number 552 may be determined subsequent to the storage of the received data record in such embodiments, and the storage subsystem may generate a numerical sequence indicator of its own for the data record and provide that indicator for inclusion in the larger sequence number assigned to the data record by the ingestion node.

Sequence numbers 552 may be used in various embodiments to provide a stable, consistent ordering of data records, and to enable repeatable iteration over records by adapters 180 and/or other data consumers. Sequence numbers assigned to the data records of a particular partition or stream may increase monotonically over time, although they need not be consecutive in at least some implementations. In various embodiments, sequence numbers may be assigned with at least some subset of the following semantics: (a) sequence numbers are unique within a stream, i.e., no two data records of a given stream may be assigned the same sequence number; (b) sequence numbers may serve as indexes into the stream's data records, and may be used to iterate over data records within a given stream partition; (c) for any given data producer, the order in which the data producer successfully submitted data records is reflected in the sequence numbers assigned to the data records; and (d) sequence numbering for data records with a given partition key value retain the monotonically increasing semantics across stream repartitioning operations—e.g., the sequence numbers assigned to data records with a partition key value K1 after a repartitioning may each be larger than any of the sequence numbers that were assigned to data records with that partition key value K1 prior to the dynamic repartitioning.

In some embodiments, a data producer may wish to influence the selection of the sequence numbers 552 assigned to at least some data records. For example, a data producer 120 may wish to demarcate boundaries or separators within the assigned sequence numbers of a stream, so that it becomes easier for data consumers of that stream to submit read requests targeted at particular subsets of the stream. In some implementations, the data producer 120 may submit an indication of a minimum sequence number as part of the submission request, and the SMS may select a sequence number in accordance with the requested minimum that also conforms to the sequence number semantics discussed above.

Figure 5B:
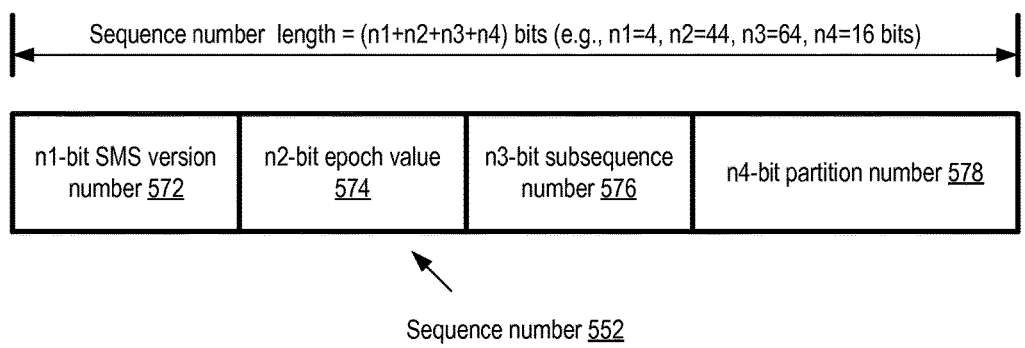
FIG. 5*b* illustrates example elements of a sequence number that may be generated for an ingested data record at an SMS, according to at least some embodiments.

FIG. 5b illustrates example elements of a sequence number that may be generated for an ingested data record at an SMS, according to at least some embodiments. The sequence number may comprise four elements in the depicted embodiment: an n1-bit SMS version number 572, an n2-bit epoch value 574, an n3-bit subsequence number 576, and an n4-bit partition number 578. In some implementations, 128 bit sequence numbers may be used, e.g., n1, n2, n3 and n4 may be 4, 44, 64 and 16 bits respectively. The version number 572 may be used simply to avoid confusion across SMS software version rollouts, e.g., so that it is easy to tell which version of the SMS software was used to generate the sequence number. Version number 572 may not be expected to change frequently in at least some implementations. The epoch value 574 may be obtained, for example, from a local clock source or a globally accessible clock source (e.g., a state management system of a provider network that implements a getCurrentEpoch or getCurrentTime API) by an ingestion node. In at least some implementations, an offset from a well-known point in time (e.g., the number of seconds that have elapsed since 00:00:00 AM UTC on Jan. 1, 1970, which can be obtained by invoking various time-related system calls in Unix™-based operating systems) may be used for the epoch value 574. In some embodiments, the subsequence number 576 may be generated by the storage subsystem and may indicate the order in which data records of a particular stream partition are written to a storage device. Thus, in an implementation in which numerous data records are received within a given second and the epoch values 574 only change at approximately one-second intervals, the subsequence numbers 576 may serve as indicators of the record arrival (or storage) order for data records that happen to have arrived within the same second and therefore are assigned the same epoch value. The partition number 578 may uniquely identify a partition within a given stream in some embodiments. In at least some embodiments, epoch information (or other clock-related information) may not be incorporated within sequence numbers 522. Even in embodiments in which epoch values are included within the sequence numbers, the sequence numbers may not be usable as reliable indicators of record submission times, especially in distributed environments in which the clocks at various ingestion nodes may not be closely synchronized and data records are submitted at high rates. In some embodiments, sequence number implementations may differ from the example shown in shown in FIG. 5b—e.g., not all the elements shown in FIG. 5b may be included in a sequence number, or other elements may be substituted for some of the illustrated elements.

Figure 6:
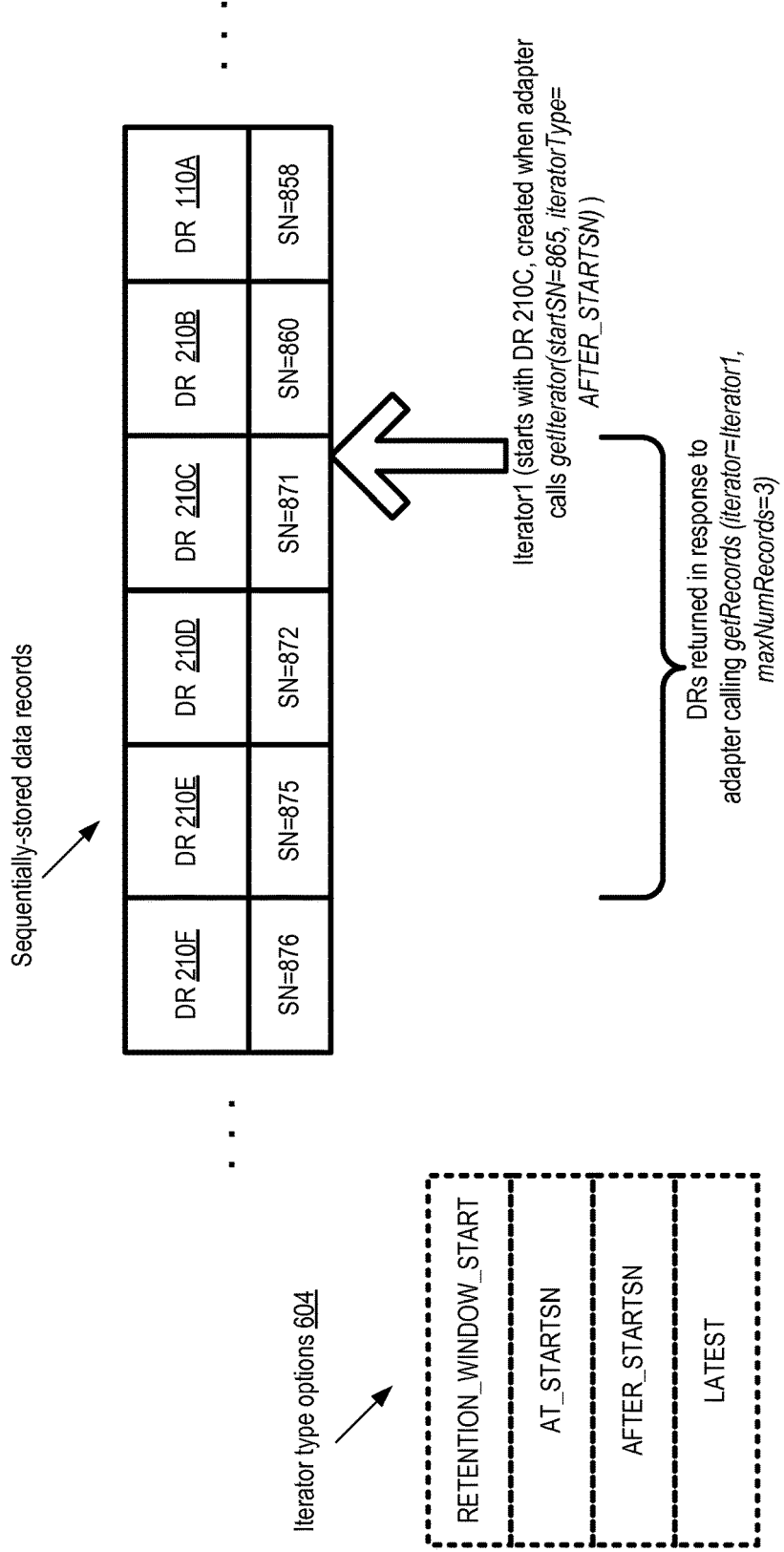
FIG. 6 illustrates an example of ordered storage and retrieval of stream data records at an SMS using an iterator, according to at least some embodiments.

Data records of a given partition may typically be written (e.g., to disk) in sequence number order at the SMS storage nodes 156, often using large sequential write operations as much as possible. In some embodiments, as indicated earlier, iterator-based programmatic interfaces may be implemented to allow data consumers to read data records in sequence number order. FIG. 6 illustrates an example of ordered storage and retrieval of stream data records at an SMS using an iterator, according to at least some embodiments. The adapter may utilize any of several different iterator types 604 in the depicted embodiment. In at least some cases, the specific type of the iterator to be used by the adapter may be selected based at least in part on client preferences indicated programmatically to the adapter. For example, in accordance with client preferences, if the adapter is to retrieve all the data records of a given partition or stream that are currently retained at the SMS, an iterator of type RETENTION_WINDOW_START may be used. In some embodiments, if no iterator type is specified by the adapter or other data consumer of the SMS in a getIterator call, an iterator of type RETENTION_WINDOW_START may be created by default. If no specific retention policy is used for a given input stream, all the data records stored for that stream may be obtained using a RETENTION_WINDOW_START iterator by default in some implementations. If the adapter is to start retrieving data records from a particular sequence number, an iterator of type AT_STARTSN may be used. If the specified sequence number does not correspond to a record stored at the SMS, the request to create the AT_STARTSN iterator may fail in some implementations. An AFTER_STARTSN iterator may be used to obtain data records starting with sequence numbers greater than or equal to a specified sequence number. In some embodiments, a client of the SMS may simply want to start by reading the most recently ingested data records, in which case the LATEST iterator type may be used, which is positioned at the data record with the highest sequence number as of the time of the getIterator request. Other types of iterators may also be supported in some embodiments.

An example use of an AFTER_STARTSN iterator and a getRecords API is also shown in FIG. 6. Six data records 210A-210F of a stream are shown stored in sequence number order. As illustrated, the sequence numbers may not be consecutive in at least some embodiments, e.g., because the manner in which the values are assigned to the epoch portions or the subsequence numbers discussed above may not always result in consecutive values for those elements. Stream-to-batch adapter 180 has requested an iterator of type AFTER_STARTSN to be created, specifying a starting sequence number "865". In response to the request, the SMS has initialized Iterator1, positioned at the data record with the nearest sequence number that is higher than the requested starting sequence number. In this case, data record 210C with sequence number 870 has been selected as the iterator's starting position, as the next lower sequence (860, assigned to data record 210B) is smaller than the starting sequence number in the consumer's request. The getIterator interface may be considered the logical equivalent of a request to set a cursor at a requested position within the partition, and the getRecords interface may be used to then read data records starting from the cursor position, e.g., to move the cursor along the stream in sequence number order. In the illustrated example, the adapter has invoked the getRecords interface with parameter "iterator" set to Iterator1 and "maxNumRecords" (the maximum number of data records to return) set to 3. Accordingly, the SMS retrieval subsystem returns the data records 210C, 210D and 210E in that order to the data consumer. The iterator Iterator1 may be moved to a new position, e.g., to data record 210F, after the getRecords call completes, and subsequent getRecords invocations for the same iterator may return data records starting with 210F.

At the start of its batching procedure for one or more BPS processing iterations, in some embodiments the adapter 180 may utilize query interfaces of the SMS (such as getLatestSequenceNumber, getLowestSequenceNumber, or isSequenceNumberValid) to determine the sequence number range of currently retained data records in the input data stream to be batched, or to verify that the sequence number information it has stored in its batching metadata repository can still be used to identify the boundaries of the next batch. Further details regarding the types of metadata elements that may be stored by the adapter in some embodiments are provided below in conjunction with the discussion of FIG. 7. Having verified the validity of the sequence numbers for data records that are to be included in the next batch, retrieval APIs such as getIterator or getRecords may then be used to retrieve the data records for inclusion in the batch. In some embodiments, random record retrieval interfaces may be used instead of or in addition to sequential or iterator-based interfaces.

Batching Metadata

Figure 7:
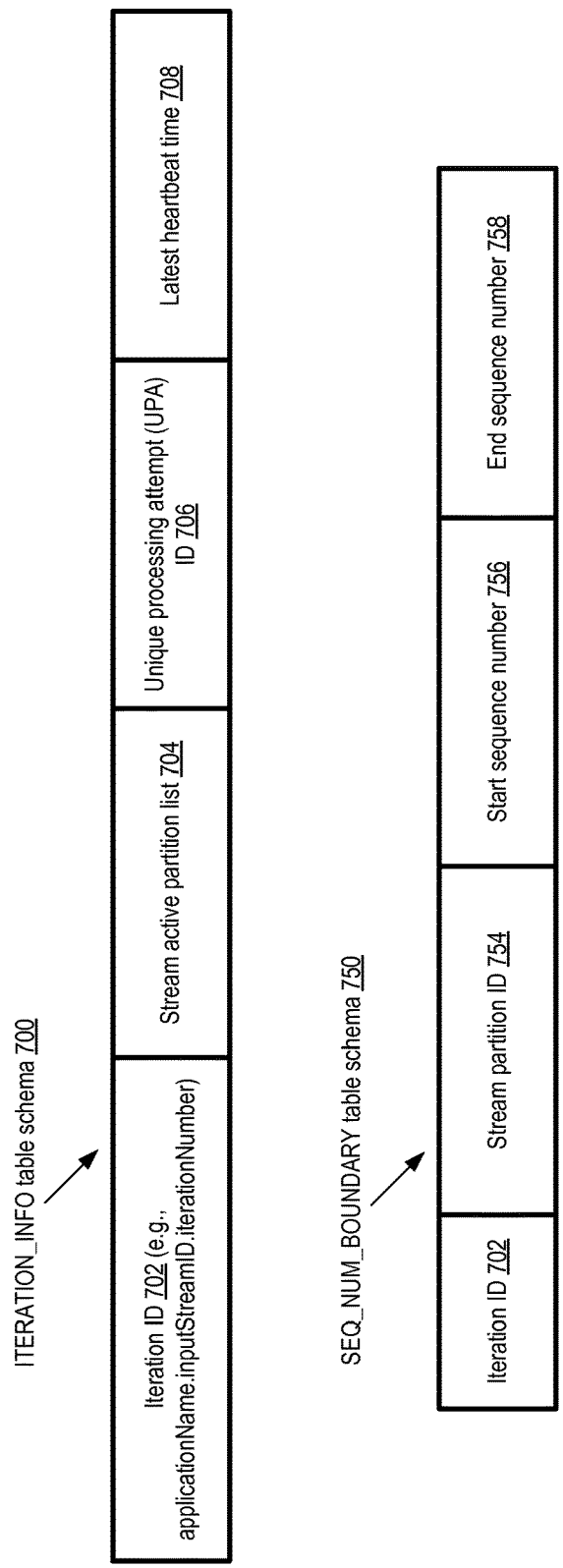
FIG. 7 illustrates example schemas of batching-related metadata tables that may be used by a stream-to-batch adapter, according to at least some embodiments.

As indicated earlier, in at least some embodiments the selection of the data records to be included within a given batch may be made using metadata saved for previous batches. FIG. 7 illustrates example schemas of batching-related metadata tables that may be used by a stream-to-batch adapter, according to at least some embodiments. The metadata table schemas shown may be used in embodiments in which input data streams are partitioned; different schemas may be used in embodiments in which stream partitioning is not used.

In the depicted embodiment, at least two logical metadata tables may be used (the underlying data may be combined into a single physical table or object in some cases, depending on the data storage implementation being used). The ITERATION_INFO table schema 700 includes columns for an iteration identifier 702, an active partition list 704, a unique processing attempt (UPA) identifier 706, and a latest heartbeat time 708. Because each iteration of processing uses a particular batch of data records as input, in at least some implementations the iteration identifier 702 may also be considered a batch identifier. The iteration identifier 702 for a given iteration of the adapter's functions may be constructed in the depicted embodiment by concatenating three elements: an application name provided by the BPS client, indicative of the processing operations or applications being run at the BPS on the stream data records, a stream identifier of the input data stream, and a monotonically increasing iteration number. Thus, for example, if the client-supplied application name is "LogAnalyzer", the input data stream identifier is "SysLogStream", and the iteration numbers start at 0 in a given implementation and are incremented each time the adapter is invoked, the first iteration identifier may be "LogAnalyzer.SysLogStream.0", the next iteration's identifier may be set to "LogAnalyzer.SysLogStream.1", and so on.

The stream active partition list entries 704 may record the set of partitions of the input data stream that are in an active state (e.g., partitions which have not been closed to further data record submissions as a result of repartitioning, time window expirations, failures, explicit partition termination requests, or other control-plane events at the SMS) at the time that the corresponding batching and/or processing iteration was completed. Changes to the active partition list 704 between one iteration and the next may indicate, for example, that retrieval of data records from newly-created partitions needs to be initiated, or that retrieval of data records from now-closed partitions is no longer required.

The unique processing attempt identifier 706 may serve in some embodiments as an indicator that one or more processing nodes 192 are currently performing processing operations on the batched data records of the iteration and have therefore obtained the equivalent of a logical lock on the iteration's input data. After the batch of stream data records is created by the adapter, in at least some embodiments the UPA ID field may initially be left empty in the ITERATION_INFO table, and the fact that it is empty may serve as indicator to a processing node 192 that the iteration is available for processing. The first processing node that examines the empty UPA ID field may store a node identifier or some other value in the UPA ID field in such an embodiment, e.g., to indicate that the node has begun processing the data. The latest heartbeat time field 708 may be updated by the processing node periodically to indicate that it is still processing the data records. Other processing nodes that have available processing capacity may examine the entries in ITERATION_INFO, trying to find data record batches that either do not have processing nodes already working on them, or whose heartbeat value has not changed for some threshold amount of time. If the heartbeat time value 708 differs from the current time by over N minutes or seconds (which may be a configurable parameter set by the client or the BPS), for example, it may be assumed that the processing node that was working on the iteration has failed, and a different processing node may be allowed to take over the processing of the batched data records. The UPA ID and the heartbeat value may together be used by processing nodes 192 of the BPS to assume processing responsibilities to in an efficient, decentralized manner in at least some embodiments. In some implementations, the UPA ID and/or a latest heartbeat time may be stored on a per-split basis (where a split, as described earlier, is a subdivision of a batch of input data for a BPS implementing MapReduce) or a per-stream-partition basis instead of, or in addition to, on a per-iteration basis. In some implementations, the iteration identifier may be used as the primary key for the ITERATION_INFO table.

A SEQ_NUM_BOUNDARY table (with schema 750) may be used to store the start and end sequence numbers of the data records, on a per-stream-partition basis, that are included within the data batches created for various iterations in the depicted embodiment. As shown, the SEQ_NUM_BOUNDARY table may include a column for an iteration identifier 702 (just as the ITERATION_INFO table did), as well as column 754 for stream partition identifiers, column 756 for the starting (or lowest) sequence number of the batched data records of that (partition, iteration) combination, and a column 758 for the ending (or highest) sequence number of the batched data records of that (partition, iteration) combination. The highest sequence number for a given iteration K may be used as a lower bound sequence number for the data records to be included within iteration K+1 in some embodiments. In at least some implementations, the combination of the iteration identifier 702 and the partition identifier 754 may be used as the primary key for the PARTITION_BOUNDARY table.

It is noted that in embodiments in which streams are not partitioned, simplified versions of the table schemas shown in FIG. 7 may be used, logically equivalent to a scenario in which each stream is only allowed to have one partition. In different implementations, the two schemas shown in FIG. 7 may not necessarily be mapped to two different physical tables within a database system—instead, for example, a single physical table comprising data corresponding to the various columns shown may be used. Any appropriate type of database system or storage repository may be used for the metadata in different embodiments, including for example a relational database service implemented at the provider network, a non-relational database service, or file storage or object storage that does not conform to any formal database semantics. In some implementations, some of the kinds of information shown in FIG. 7 may not be included in the metadata stored by adapter 180, or other columns may be included.

In at least some embodiments, various configurable and/or client-selectable parameters may be utilized for batching stream data records. For example, clients may specify one or more timeout settings that are to be used to terminate data record retrieval for a given iteration—e.g., if no new records arrive at a stream or at a partition in T seconds, the batch 144 for that iteration may be designated as complete, regardless of the original duration for which data records were to be connected. In some embodiments, clients may specify the names and database coordinates (e.g., database instance names, network addresses, authorization credentials etc.) of tables to be used for the batch metadata. The minimum and/or maximum number of resources (e.g., compute instances of a virtual computing service implemented at the provider network) to be used by the adapter itself, or by the BPS for a given application or iteration, may also be indicated as input parameters in some embodiments. In some implementations, clients may set parameters limiting the maximum amount of data retrieved, the maximum number of data records retrieved, or the maximum billing amounts (which may be dependent upon the number and types of resources used by the adapter) acceptable for a particular processing application or iteration.

Methods for Batching Stream Data Records

Figure 8:
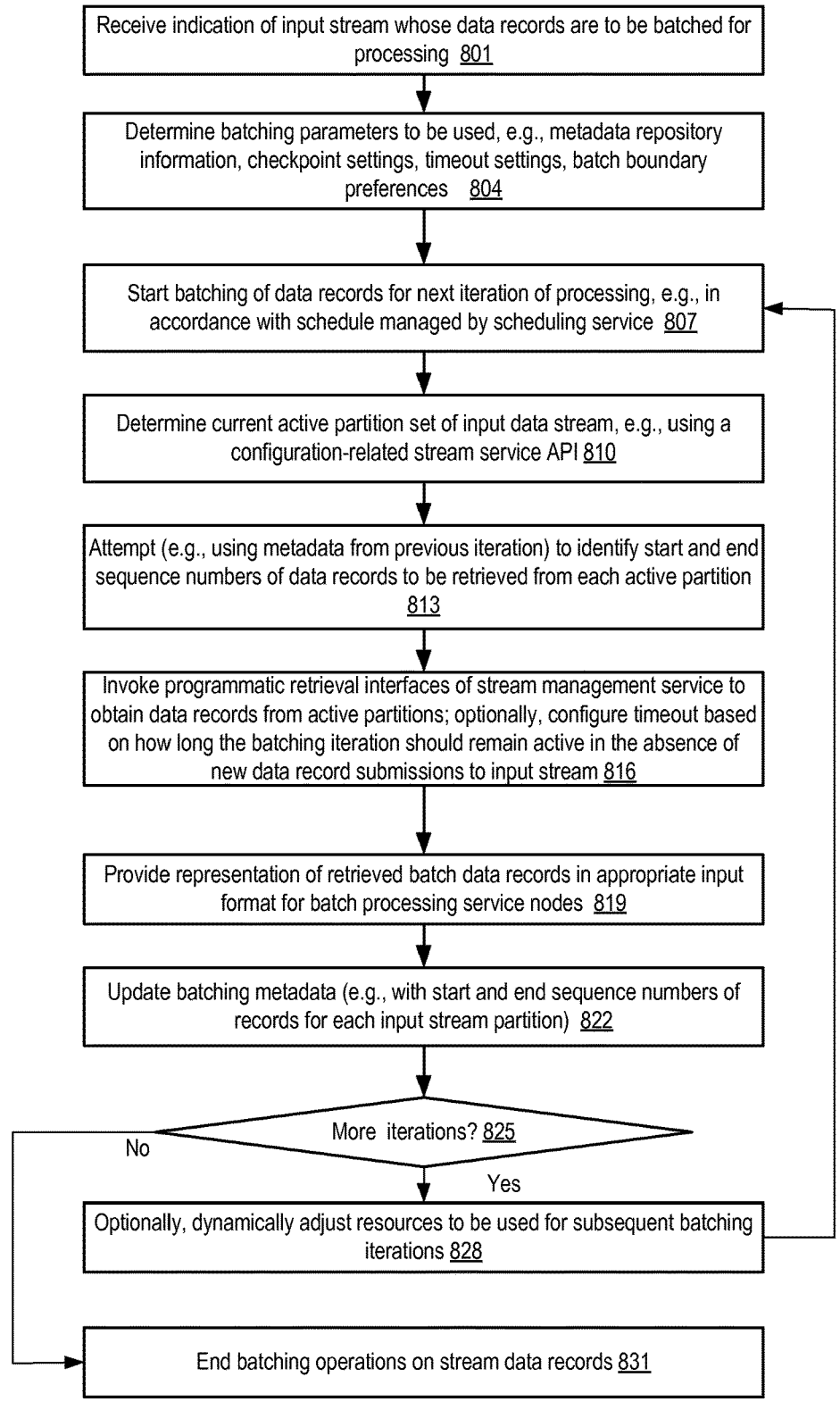
FIG. 8 is a flow diagram illustrating aspects of operations that may be performed to generate batches of stream data records for consumption by a batch-oriented processing service, according to at least some embodiments.

FIG. 8 is a flow diagram illustrating aspects of operations that may be performed to generate batches of stream data records for consumption by a batch-oriented processing service, according to at least some embodiments. As indicated in element 801, an indication of an input data stream of an SMS, whose data records are to be batched for a BPS, may be received at a stream-to-batch adapter 180. Such an indication may, for example, be provided using batch processing tools 134, such as a Hive script or a shell script. In some implementations, an identifier of the stream may be included in an input parameter file or configuration file for the adapter or for a BPS application. Other parameters to be used by the adapter as it generates data record batches from the input data stream may be determined (element 804), including for example the timeout values to be used, the input format expected by the BPS processing nodes, checkpoint settings indicating whether the start and end sequence numbers are to be saved in the metadata repository, metadata repository information such as the names/identifiers of the metadata tables or files to be used, and so on. In some embodiments, a client 133 may indicate preferences regarding the starting point of the data record batches to be derived from the input stream. For example, the client may request, using a parameter setting, that only data collected from 8 AM of the current day onwards should be batched, even if stream data generated earlier is still available from the SMS.

The batching of stream data records for the next iteration of processing at the BPS may then commence (element 807). In some embodiments the batching operations may be initiated by a scheduling service of the provider network, e.g., in accordance with a schedule created for the batch processing application at the request of the client. Such a scheduling service may enable the client to specify dependencies among resources and activities, start and end times of various activities and resource activation periods, limits on the number and types of resources to be used by the adapter and/or the BPS processing nodes, and so on. Clients may also utilize regular shell scripts instead of, or in addition to, the scheduling service in some embodiments.

In the depicted embodiment, an API of the SMS (e.g., similar to the describeStream API discussed earlier) may be invoked to identify the current set of active partitions of the input data stream (element 810). Depending on various factors such as workload imbalances at SMS nodes, or failures at SMS nodes, in some embodiments the input data stream may have been repartitioned since the previous occasion when the partition list was obtained. For example, some partitions may have been merged or closed to any further data record submissions, while new partitions may have been activated. The adapter may accordingly re-evaluate the set of resources to be used to retrieve data records if the active partition set has changed.

In at least some embodiments, the starting and ending sequence numbers of previous iterations' data records may be saved by the adapter as part of its batching metadata. If the current iteration is not the first iteration, earlier-stored batching metadata may be examined in an attempt to determine the boundary sequence numbers for each active partition for the current iteration (element 813). If the current iteration is the first iteration, in some embodiments all the data records available from the input data stream (e.g., in accordance with the stream's retention policy) up to the most recent sequence number as of the time the adapter starts the batching may be included in the batch for the current iteration. If the client specifies a starting criterion for the first iteration (e.g., that only records written since 8 AM should be included), the adapter may attempt to meet that requested criterion when determining the contents of the first batch. As noted earlier, it may not always be possible to determine the exact times at which data records are ingested at the input data stream, so some timing-related constraints regarding batch contents may only be met approximately in at least some embodiments.

Programmatic record retrieval interfaces of the SMS, such as the getIterator and getRecords interfaces described above, may be invoked to retrieve the set of data records identified for the batch (element 816). In at least some implementations, clients may wish to stop the retrieval of data records of an iteration if new records are no longer being appended to the data stream for some specified length of time. In such a scenario, the adapter may start a timer with a specified timeout value when the most recent record available has been read, so that the expiration of the timeout may serve as an indication to terminate collection of data records for the batch. Thus, in at least some embodiments, retrieval of data records for a given batch or iteration may be terminated based either on a schedule (e.g., the adapter may be scheduled to run for X minutes at a time), or as a result of a timeout.

A representation of the retrieved data records may be provided in the appropriate input format to the BPS processing nodes (element 819). For example, some BPS processing nodes may expect data records in JSON format or in the form of deserialized Java™ objects, and the adapter may transform the data records as needed to meet the requirements of the BPS nodes. In at least some implementations, the adapter may write the data records in the appropriate format into a memory or storage device from which they can be accessed by the BPS processing nodes.

The adapter may save batching metadata for the current iteration into a persistent repository (element 822). The metadata may include various elements similar to those shown in FIG. 7, such as the start and end sequence numbers of the batch, the set of active partitions as of the end of the batch, and so on. In at least some embodiments, the processing nodes of the BPS may be able to access and/or write to the metadata repository, e.g., to claim responsibility for processing some set of batched data records, or to indicate their health status by inserting heartbeat information.

The adapter may check whether additional iterations are to be performed (element 825). Batching operations of the adapter may be terminated for a variety of reasons in different embodiments—e.g., if the input data stream itself is closed, or if the client only wanted a specified number of iterations to be run. If additional iterations are to be scheduled, the operations corresponding to elements 807 onwards may be repeated; otherwise, the batching operations on the input data stream may be ended (element 831). In some embodiments, the adapter may collect metrics on its performance, and may periodically examine such metrics to determine whether resource allocation changes should be made for subsequent iterations (element 828). For example, if un-batched data records are accumulating at an undesired rate, or if the resources (such as compute instances) currently being used for batching are being utilized at very high levels, additional resources may optionally be dynamically deployed for subsequent batching iterations. Alternatively, if the resources currently being used are underutilized according to some threshold criteria, some of the resources may optionally be freed or redeployed in the depicted embodiment.

Figure 9:
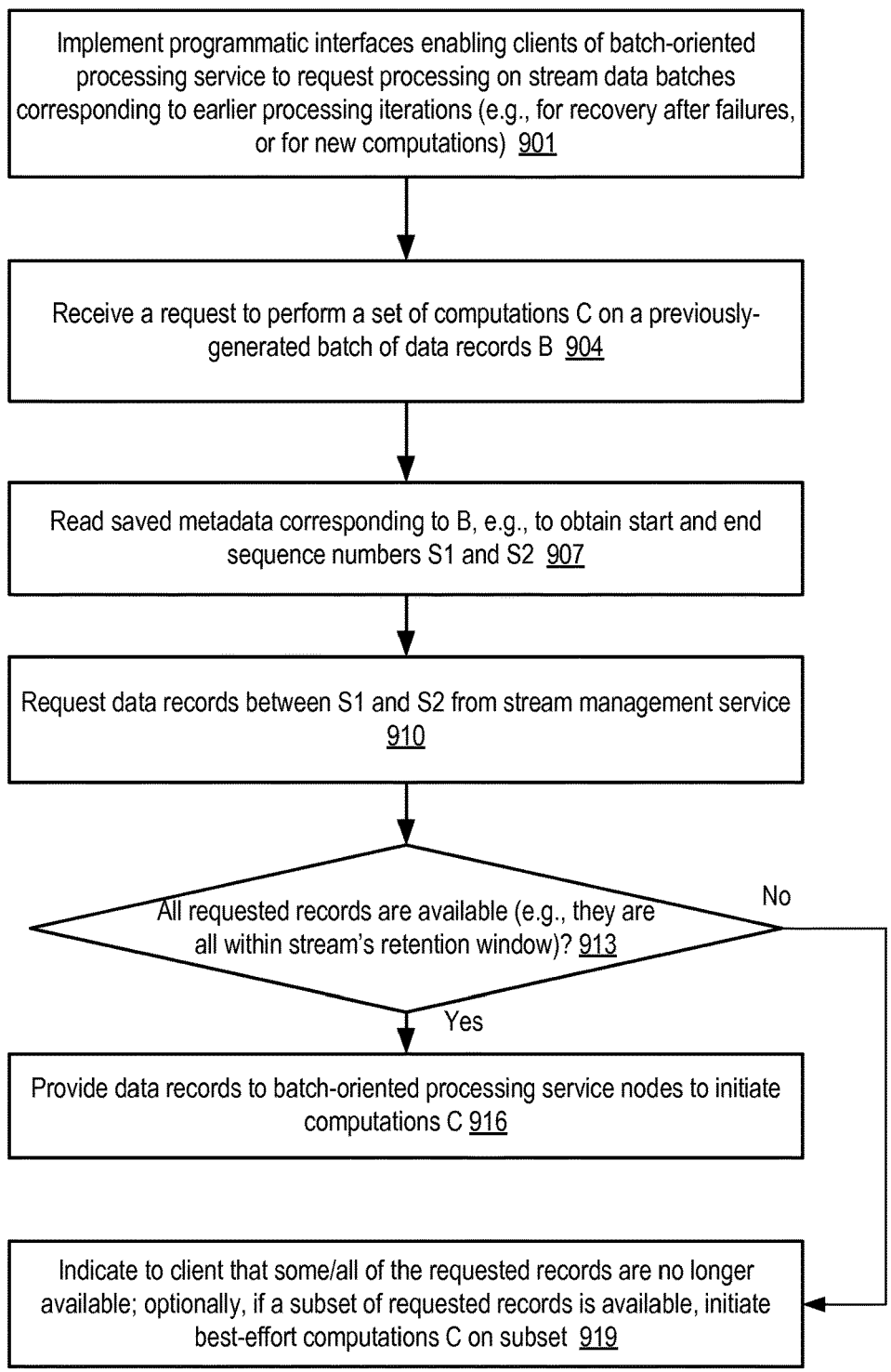
FIG. 9 is a flow diagram illustrating aspects of operations that may be performed to support consistent re-processing of stream data records, according to at least some embodiments.

The metadata saved by the adapter may be useful for several different purposes in at least some embodiments. As indicated above, the sequence number boundary information of an earlier iteration may be used to determine the starting sequence number for the current iteration. In addition, saved sequence numbers may also be used to re-do processing, or perform different processing operations, on the same underlying set of stream data in some embodiments. FIG. 9 is a flow diagram illustrating aspects of operations that may be performed to support consistent re-processing of stream data records, according to at least some embodiments. As shown in element 901, programmatic interfaces may be implemented to enable BPS clients to request processing on stream data batches corresponding to earlier processing iterations. Such interfaces may, for example, include APIs in which clients can use the iteration identifiers stored in the batching metadata to precisely indicate the input data set for a processing operation or operations. In some embodiments, batch processing tools 134, such as scripts of various types that can recognize and interpret such iteration identifiers as indicators of input data sets, may be generated.

A request to perform a set of computations C on a previously generated batch B of stream data may be received programmatically by the adapter (element 904). Batching metadata that specifies the start and end sequence numbers S1 and S2 of B may be read from the metadata repository (element 907). The set of stream data records corresponding to B's sequence number range may be requested from the SMS, e.g., using the appropriate retrieval APIs (element 910).

In at least some embodiments, as described earlier, a retention policy may be used for the input data stream, in accordance with which data records may be discarded after some time period or if the space allocated for the stream is filled. Thus, some or all of the requested data records may no longer be available when requested. If all the requested records are all available (as determined in element 913), they may be provided to the BPS processing nodes for the computations C. If at least some of the requested records are no longer available, the adapter may inform the requesting client (element 916). In some embodiments, at the request of the client or with the consent of the client, instead of aborting/rejecting the requested computations, a best-effort approach may be used in which the subset of records that are still available at the SMS (if any) may be provided to the processing nodes of the BPS, and the computations C may be performed on the incomplete input data set.

It is noted that in various embodiments, operations other than those illustrated in the flow diagrams of FIGS. 8 and 9 may be used to implement the stream-to-batch transformation functionality described above. Some of the operations shown may not be implemented in some embodiments, implemented in a different order, or in parallel rather than sequentially. It is also noted that, with respect to each of the functions for which programmatic interfaces are supported in various embodiments, any combination of one or more techniques may be used for implementing the interfaces, including the use of web pages, web sites, web-services APIs, other APIs, command-line tools, graphical user interfaces, mobile applications (apps), tablet apps, and the like.

Use Cases

The techniques described above, of extracting continually-arriving stream data records into groups that can be processed at a batch-oriented processing service, may be useful in a number of scenarios. Many large-scale data processing applications have been built in recent years using MapReduce and other similar batch-oriented approaches. Substantial resources have been dedicated to training staff in the languages, methodologies and tools that are used for the batch-processing approaches. In addition, the batch-oriented approach may be particularly well suited to certain types of applications, such as those involving processing of web usage logs, application or system logs, and the like. Users of such batch-oriented infrastructures may wish to take advantage of the existing toolsets and expertise to analyze stream data as well. For example, large provider networks may comprise thousands of instance hosts implementing service instances of a number of different multi-tenant or single-tenant services for tens of thousands of clients simultaneously. Monitoring and/or billing agents installed on the various instances and hosts may rapidly generate thousands of metric records, which may need to be stored and analyzed in batches to produce accurate billing records, to determine effective provisioning plans for the data centers of the provider network, to detect network attacks, and the like. Similarly, log records from various hosts and servers of a large distributed system may form the input for an SMS, and the log records may be suited for batch processing to discover correlated problems, analyze error trends and so on. An adapter that transforms dynamically fluctuating data streams into re-usable data batches in a reliable manner may be very well suited for such types of applications.

A number of different "big data" applications may also be built using the adapter together with an SMS and a BPS. For example, the analysis of trends in various forms of social media interactions may be performed efficiently using streams. Data collected from mobile phones or tablet computers, such as location information of the users, may be managed as stream records and analyzed with the help of an adapter at a BPS. Audio or video information, collected for example from a fleet of monitoring cameras may represent another category of streaming data set that could be collected and processed in batch mode. Scientific applications that require analysis of ever-growing data sets, collected for example from weather satellites, ocean-based sensors, forest-based sensors, astronomical telescopes, may also benefit from the stream-to-batch conversion techniques described herein.

Illustrative Computer System

Figure 10:
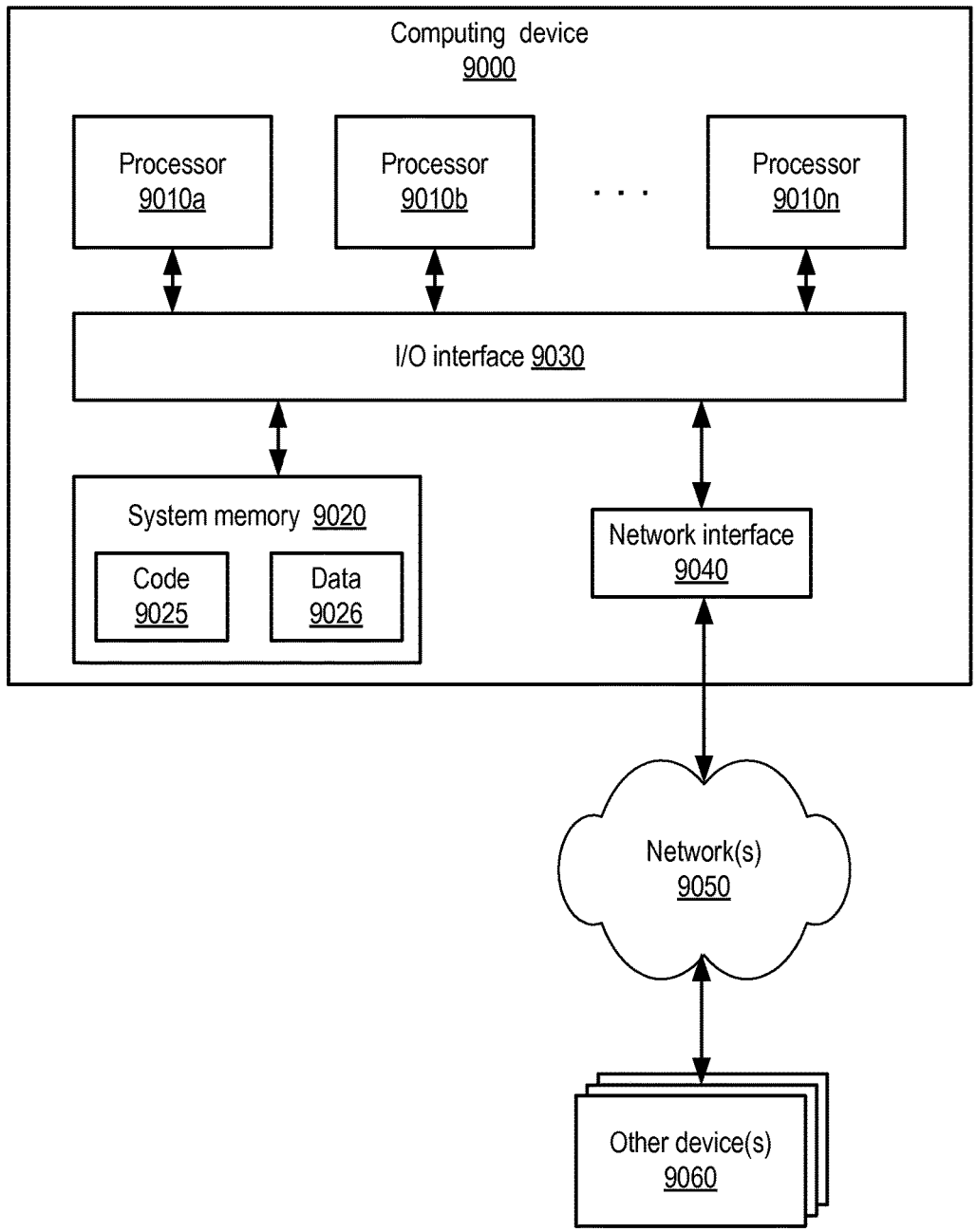
FIG. 10 is a block diagram illustrating an example computing device that may be used in at least some embodiments.

In at least some embodiments, a server that implements a portion or all of one or more of the technologies described herein, including the techniques to implement the components of the adapter, the SMS and BPS nodes, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In various embodiments, system memory 9020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices used to store physical replicas of data object partitions. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising one or more hardware processors and memory and configured to:
receive, from a client of a batch-oriented data processing service implementing a MapReduce programming model at a provider network, an indication of an input data stream comprising a plurality of data records that are to be batched for at least a first computation at the data processing service, wherein the plurality of data records are received from a plurality of data producers and retained during a time window by a multi-tenant stream management service of the provider network;
retrieve from the stream management service, based at least in part on respective sequence numbers associated with data records of the input data stream by the stream management service, a set of data records of the input data stream on which the first computation is to be performed during a particular processing iteration at the batch-oriented data processing service, wherein the set of data records comprises a plurality of retrieved data records of the input data stream;
save, in a persistent repository, metadata that corresponds to the set of data records of the input data stream, the metadata for the set of data records of the input data stream comprising an iteration identifier that uniquely identifies the particular processing iteration for the plurality of retrieved data records of the input data stream with respect to at least one of previous processing iterations completed prior to the particular processing iteration for sets of data records of input data streams and subsequent processing iterations to be performed subsequent to the particular processing iteration for other sets of data records of input data streams at the batch-oriented data processing service, and wherein the metadata for the set of data records of the input data stream further comprises two or more sequence numbers of respective records of the set of data records that indicate a range of sequence numbers of the set of data records of the input data stream on which the first computation is to be performed during the particular processing iteration for the plurality of retrieved records of the input data stream at the batch-oriented data processing service;
generate a batch representation of the set of data records in accordance with a data input format supported at the batch-oriented processing service;

schedule the particular processing iteration at selected nodes of the batch-oriented data processing service; and execute the scheduled particular processing iteration at the selected nodes based on the saved metadata.

2. The system as recited in claim 1, wherein the one or more computing devices are further configured to:
in response to a request to perform a subsequent computation on the set of data records processed during the particular processing iteration,
utilize the metadata to retrieve, from the stream management service, the set of data records; and
initiate the subsequent computation on the set of data records.

3. The system as recited in claim 2, wherein the one or more computing devices are further configured to:
determine that the first computation failed at one or more of the selected nodes; and
repeat, as part of the subsequent computation, one or more operations of the first computation on the set of data records in response to the determination that the first computation failed.

4. The system as recited in claim 1, wherein the input data stream comprises a plurality of partitions, wherein a sequence number associated with a particular data record of a particular partition of the input data stream comprises an indication of an order in which the particular data record was stored within the particular partition relative to other data records of the particular partition, wherein the one or more computing devices:
include, within the metadata, an indication of the respective sequence numbers of data records with the lowest and highest sequence numbers among the data records of a first partition of the input data stream that were batched for the particular processing iteration; and
submit a retrieval request to the stream management service to retrieve one or more data records of the first partition for a subsequent processing iteration at the batch-oriented data processing service, wherein the retrieval request includes the highest sequence number as a lower boundary parameter to be used to select the one or more data records.

5. The system as recited in claim 1, wherein the one or more computing devices are further configured to:
determine a timeout setting, corresponding to a duration during which no new data records are added to the input data stream, to be used to terminate retrieval of data records from the input data stream for a processing iteration at the batch-oriented data processing service; and
terminate retrievals of data records from the input data stream for a different processing iteration at the batch-oriented data processing service in accordance with the timeout setting.

6. A method, comprising:
performing, by one or more computing devices:
receiving, from a client of a batch-oriented data processing service at a provider network, an indication of an input data stream comprising a plurality of data records that are to be batched for at least a first computation at the data processing service, wherein the plurality of data records are stored at a multi-tenant stream management service;
obtaining, based at least in part on respective sequence numbers associated with data records of the input data stream, a set of data records of the input data stream on which the first computation is to be performed during a particular processing iteration at the batch-oriented data processing service, wherein the set of data records comprises a plurality of retrieved data records of the input data stream;
saving, in a persistent repository, metadata that corresponds to the set of data records of the input data stream, the metadata for the set of data records of the input data stream comprising an iteration identifier that uniquely identifies the particular processing iteration for the plurality of retrieved data records of the input data stream with respect to at least one of previous processing iterations completed prior to the particular processing iteration for sets of data records of input data streams and subsequent processing iterations to be performed subsequent to the particular processing iteration for other sets of data records of input data streams at the batch-oriented data processing service, the metadata for the set of data records of the input data stream further comprising two or more sequence numbers of respective records of the set of data records that indicate a range of sequence numbers of the set of data records of the input data stream on which the first computation is to be performed during the particular processing iteration for the plurality of retrieved records of the input data stream at the batch-oriented data processing service;
scheduling the particular processing iteration at selected nodes of the batch-oriented data processing service; and
executing the scheduled particular processing iteration at the selected nodes based on the saved metadata.

7. The method as recited in claim 6, further comprising performing, by the one or more computing devices:
providing, to the selected nodes of the batch-oriented data processing service, a representation of the set of data records in accordance with an input format supported by the selected nodes.

8. The method as recited in claim 6, wherein said indication of the input data stream is received via a programmatic web services interface at a component of a multi-tenant network-accessible service.

9. The method as recited in claim 6, further comprising performing, by the one or more computing devices:
in response to a request to perform a subsequent computation on the set of data records that were processed during the particular processing iteration,
utilizing the metadata to retrieve, from the stream management service, at least a subset of the data records processed during the particular processing iteration; and
initiating the subsequent computation on the at least a subset of the data records.

10. The method as recited in claim 9, further comprising performing, by the one or more computing devices:
determining that the first computation failed at one or more of the selected nodes; and
repeating, as part of the subsequent computation, one or more operations of the first computation in response to said determining that the first computation failed.

11. The method as recited in claim 9, further comprising performing, by the one or more computing devices:
receiving, from the client via a programmatic interface, an indication of the subsequent computation that includes at least one operation that was not included in the first computation.

12. The method as recited in claim 6, wherein the stream management service is configured to discard data records of the input data stream in accordance with a retention policy, further comprising performing, by the one or more computing devices:
  in response to a request to perform a subsequent computation,
    determining that one or more data records of the set have been discarded in accordance with the retention policy; and
    providing an indication to the client that the one or more data records are no longer available from the input data stream.

13. The method as recited in claim 6, further comprising performing, by the one or more computing devices:
  invoking a programmatic interface of a scheduling service of the provider network to schedule the particular processing iteration.

14. The method as recited in claim 6, wherein the input data stream comprises a plurality of partitions, wherein a sequence number associated with a particular data record of a particular partition of the input data stream comprises an indication of an order in which the particular data record was stored within the particular partition relative to other data records of the particular partition, further comprising performing, by the one or more computing devices:
  including, within the metadata, an indication of the respective sequence numbers of data records with the lowest and highest sequence numbers among the data records of a first partition of the input data stream that were batched for the particular iteration; and
  submitting a retrieval request to the stream management service to retrieve one or more data records of the first partition for a subsequent processing iteration at the batch-oriented data processing service, wherein the retrieval request includes the highest sequence number as a lower boundary parameter to be used to select the one or more data records.

15. The method as recited in claim 6, further comprising performing, by the one or more computing devices:
  determining a timeout setting, corresponding to a maximum duration during which data records are not added to the input data stream, to be used to terminate retrieval of data records from the input data stream for a processing iteration at the batch-oriented data processing service; and
  terminating retrievals of data records from the input data stream for a different processing iteration at the batch-oriented data processing service in accordance with the timeout setting.

16. A non-transitory computer-accessible storage medium storing program instructions that when executed on one or more processors:
  receive an indication of an input data stream comprising a plurality of data records that are to be batched for at least a first computation at a batch-oriented data processing service, wherein the plurality of data records are stored at a stream management service of a provider network;
  identify, based at least in part on respective sequence numbers associated with data records of the input data stream, a set of data records of the input data stream on which the first computation is to be performed during a particular processing iteration at the batch-oriented data processing service, wherein the set of data records comprises a plurality of retrieved data records of the input data stream;
  save, in a persistent repository, metadata that corresponds to the set of data records of the input data stream, the metadata for the set of data records of the input data stream comprising an iteration identifier that uniquely identifies the particular processing iteration for the plurality of retrieved data records of the input data stream with respect to at least one of previous processing iterations completed prior to the particular processing iteration for sets of data records of input data streams and subsequent processing iterations to be performed subsequent to the particular processing iteration for other sets of data records of input data streams at the batch-oriented data processing service, the metadata for the set of data records of the input data stream further comprising two or more sequence numbers of respective records of the set of data records that indicate a range of sequence numbers of the set of data records of the input data stream on which the first computation is to be performed during the particular processing iteration for the plurality of retrieved records of the input data stream at the batch-oriented data processing service;
  schedule the particular processing iteration at selected nodes of the batch-oriented data processing service; and
  initiate execution of the scheduled particular processing iteration at the selected nodes based on the saved metadata.

17. The non-transitory computer-accessible storage medium as recited in claim 16, wherein the instructions when executed by the one or more processors:
  provide, to selected nodes of the batch-oriented data processing service, a representation of the set of data records in accordance with an input format supported by the selected nodes.

18. The non-transitory computer-accessible storage medium as recited in claim 16, wherein the instructions when executed at the one or more processors:
  determine that the first computation failed at one or more nodes of the batch-oriented processing service; and
  retrieve, using the metadata, the set of data records from the stream management service; and
  repeat one or more operations of the first computation on the set of data records.

19. The non-transitory computer-accessible storage medium as recited in claim 16, wherein the input data stream comprises a plurality of partitions, wherein the sequence number associated with a particular data record of a particular partition of the input data stream comprises an indication of an order in which the particular data record was stored within the particular partition relative to other data records of the particular partition, wherein the instructions when executed at the one or more processors:
  include, within the metadata, an indication of the respective sequence numbers of data records with the lowest and highest sequence numbers among the data records of a first partition of the input data stream that were batched for the particular iteration; and
  submit a retrieval request to the stream management system to retrieve one or more data records of the first partition for a subsequent processing iteration at the batch-oriented data processing service, wherein the retrieval request includes the highest sequence number as a lower boundary parameter to be used to select the one or more data records.

20. The non-transitory computer-accessible storage medium as recited in claim 16, wherein the input data stream comprises a plurality of partitions, wherein the instructions when executed on the one or more processors:
- include, within the metadata, a partition identifier corresponding to each active partition of the input data stream and a corresponding highest sequence number among the sequence numbers of data records of the partition that have been batched;
- in response to determining, using a programmatic interface implemented by the stream management service, that an additional partition of the input data stream has been activated in accordance with a repartitioning of the input data stream, retrieving data records of the additional partition for processing at the batch-oriented data processing service.

* * * * *